(12) United States Patent
Cleary et al.

(10) Patent No.: US 9,082,143 B1
(45) Date of Patent: Jul. 14, 2015

(54) MERCHANT ATTRIBUTION FOR SALES

(75) Inventors: Andrew J. Cleary, Bellevue, WA (US); Craig K. Carl, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 101 days.

(21) Appl. No.: 13/594,593

(22) Filed: Aug. 24, 2012

(51) Int. Cl.
*G06Q 30/00* (2012.01)
*G06F 17/30* (2006.01)
*G06Q 30/06* (2012.01)

(52) U.S. Cl.
CPC ........ *G06Q 30/0601* (2013.01); *G06Q 30/0613* (2013.01)

(58) Field of Classification Search
CPC ...................................... G06Q 30/06
USPC ................................ 705/26.1–27.2
See application file for complete search history.

(56) References Cited

U.S. PATENT DOCUMENTS

| | | | |
|---|---|---|---|
| 6,912,505 B2 | 6/2005 | Linden et al. | |
| 7,129,891 B2 * | 10/2006 | Meunier | 342/463 |
| 7,881,984 B2 | 2/2011 | Kane, Jr. et al. | |
| 8,069,088 B1 | 11/2011 | Foulser et al. | |
| 8,688,524 B1 * | 4/2014 | Ramalingam et al. | 705/16 |
| 8,773,437 B1 | 7/2014 | Goldman et al. | |
| 2004/0078305 A1 * | 4/2004 | Weller | 705/27 |
| 2006/0080174 A1 | 4/2006 | Veeneman et al. | |
| 2007/0136140 A1 * | 6/2007 | Smith | 705/26 |
| 2008/0162371 A1 | 7/2008 | Rampell et al. | |
| 2009/0143056 A1 * | 6/2009 | Tang et al. | 455/418 |
| 2009/0179753 A1 * | 7/2009 | Bonner et al. | 340/539.32 |
| 2009/0222322 A1 | 9/2009 | Andersen et al. | |
| 2009/0259547 A1 * | 10/2009 | Clopp | 705/14.16 |
| 2009/0287556 A1 | 11/2009 | Beirne et al. | |
| 2009/0307013 A1 | 12/2009 | Altounian et al. | |
| 2010/0056173 A1 * | 3/2010 | Bloom et al. | 455/456.1 |
| 2011/0196895 A1 | 8/2011 | Yi | |
| 2012/0054011 A1 * | 3/2012 | Petersen et al. | 705/14.16 |
| 2012/0072274 A1 * | 3/2012 | King et al. | 705/14.16 |
| 2013/0030879 A1 * | 1/2013 | Munjal | 705/7.42 |
| 2013/0203439 A1 * | 8/2013 | Lifshitz et al. | 455/456.2 |

OTHER PUBLICATIONS

PR Newswire, "ARS interactive and CellPoint mobile partner to introduce the only fully integrated mobile retail shopping solution in the united states with near field communication technology." (Jan. 6, 2011). Retrieved from https://search.proquest.com/professional/professional/docview/822998836?accountid=142257.*

Office Action for U.S. Appl. No. 13/607,358, mailed on Mar. 20, 2014, Craig K. Carl, "Commission Calculation for Referrals", 22 pages.

Office Action for U.S. Appl. No. 13/210,926, mailed on Nov. 19, 2014, Brian C. Hanley, "Physical Sales of Digital Items", 10 pages.

Office Action for U.S. Appl. No. 13/607,358, mailed on Oct. 23, 2014, Craig K. Carl, "Commission Calculation for Referrals", 26 pages.

Office Action for U.S. Appl. 13/594,522, mailed on Jan. 20, 2015, Craig K. Carl, "Merchant Attribution for Sales", 14 pages.

* cited by examiner

*Primary Examiner* — Kathleen Palavecino
*Assistant Examiner* — Jennifer Lee
(74) *Attorney, Agent, or Firm* — Lee & Hayes, PLLC

(57) ABSTRACT

A brick-and-mortar merchant may receive a commission when a user interacts with an item at the brick-and-mortar merchant but later purchases the same or similar item from another source such as an online retailer. Interaction between the user and the brick-and-mortar merchant may be determined by geolocating a mobile device near or within a location of the merchant. In some embodiments, the online retailer may refer a customer to retail partners that may offer the item for viewing. The online retailer may track and compensate the retail partner for interacting with a user when the user visits the retail partner's location and possibly receives sales help and then later obtains the item from the online retailer.

26 Claims, 13 Drawing Sheets

MERCHANT ATTRIBUTION FOR SALES

BACKGROUND

Brick-and-mortar merchants, or simply "merchants," that stock physical inventory can incur significant costs to maintain retail locations and pay staff in order to display and promote sales of goods and services. Customers may find the ability to interact with goods and talk with sales staff desirable when making purchasing decisions. However, due to the cost of providing these services to customers, merchants may charge higher prices than other sources such as online retailers. The goods and services, both represented by the term "items," may include anything that can be offered for purchase, rental, subscription, etc. including tangible items and intangible digital items. Once a customer has identified the particular item he or she wishes to purchase by browsing the items or talking to sales staff at the merchant, the customer may make the purchase from another source such as a discount merchant, an online retailer, etc. This can potentially lead to a situation in which merchants are providing showroom services for online retailers or other lower-cost merchants.

This situation creates a disadvantage for the merchants because they incur the costs of providing valuable services to the customers yet the revenues obtained from making a sale are realized by other entities. The online retailers, and other entities like discount merchants, may appreciate that their own sales will be hurt if the brick-and-mortar merchants are unable to maintain profitable businesses.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
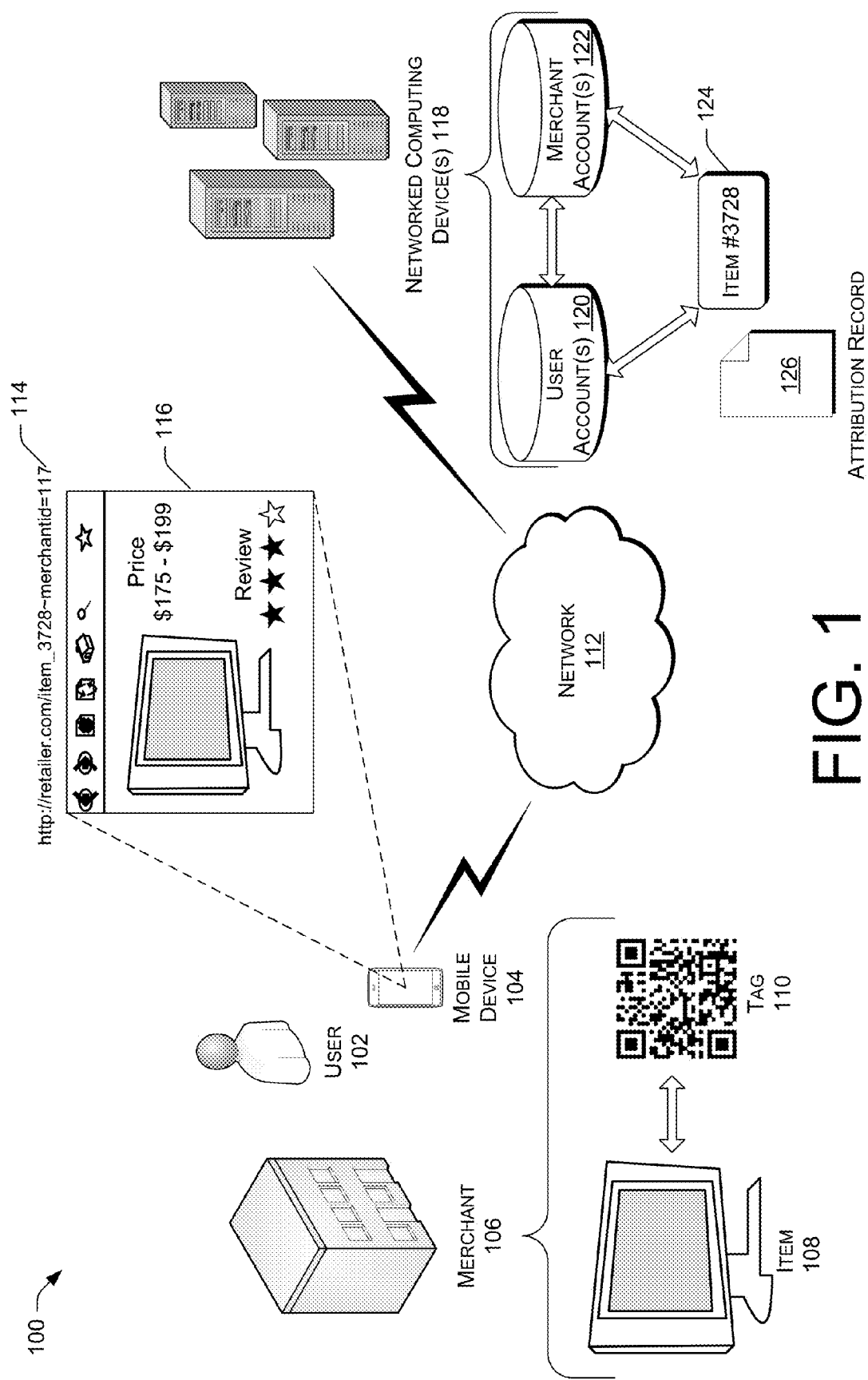
FIG. 1 is an example architecture that shows interconnectivity between various computing devices to enable tracking of user interaction with some merchants and purchases from different merchants.

This disclosure describes, in part, techniques for attributing sales of items to a brick-and-mortar merchant when the sale is completed by another seller such as an online retailer. Mobile computing devices, like smart phones, are becoming increasingly ubiquitous. These mobile computing devices are capable of performing many specialized tasks, often under control of a downloadable application or a browser.

Some applications allow consumers to use a camera on a mobile computing device to scan barcodes on items at merchant locations, which enable the customers to look up pricing and other information about those items using the application. Generally, the bar code is placed on the item or packaging by the manufacturer and does not include any information about the merchant. Software on the mobile computing device may convert the image of the bar code into digital information such as a numeric code, which may then be used to obtain results based on that code. The information obtained by consumer in this way may allow the consumer to find a different source for the same item at a lower price. For example, the consumer may later go home and use his or her personal computer to order the item from an e-commerce website or online retailer. However, in this situation only the consumer knows that his or her decision to purchase the item was influenced in part by viewing item at the merchant. The online retailer that ultimately sold the item to the customer is unable to attribute the sale to the merchant and provide the merchant a commission or any other type of compensation.

The techniques described in this disclosure include use of tags that include an identification of the merchant and one or more items available for sale at the merchant. The tags may include any type of machine-readable mechanism for representing information such as printed text, a one-dimensional bar code, a matrix barcode (e.g., quick response (QR) Code®), a radio frequency identification (RFID) tag, a radio signal (e.g., Bluetooth®), a near field communication (NFC) tag, and the like. The tags may be placed near or over pre-existing barcodes on the items or item packaging when used to modify pre-existing barcodes. These tags, when placed on a specific item, may create a unique correlation between that item and the merchant. Tagging the entire inventory of a merchant may be burdensome, so the merchant may also place one or more tags around the store, such as on a large poster, that are associated with the merchant and some or all of the items in the inventory of the merchant.

When a tag is scanned by the user of a mobile device (e.g., a customer) the act of scanning creates an association between the mobile device and the tag which in turn allows the user of the mobile device to be associated with the item and the merchant represented by the tag. In some implementations, scanning the tag may cause the mobile device to access an item page that is uniquely identified with one or more items and with the merchant and associated with the user by an identifier (e.g., a cookie, etc.) stored on the mobile device.

If the same or similar item is later sold to the user from a source (e.g., an online retailer) that can access this association record, then the source that made the sale may be able to attribute the earlier interaction with the item (i.e., scanning the code associated with the item) to the merchant. When this information is available to the entity that sold the item to the user, then a commission may be calculated for the merchant. The amount of the commission may be based on a prior agreement between the merchant and the seller of the item.

In some implementations, the user's presence at the merchant may be interpreted as associating the user with some or all of the inventory of the merchant. If the user does not scan a tag associated with a particular item, the user may still scan a tag that is associated with the merchant and an inventory record of the merchant. For example, the merchant may have a large matrix barcode printed on a poster near an exit with a comment encouraging customers to scan the matrix barcode with their mobile devices (e.g., "support your local merchant with online referral fees," "scan this to get 5% off your next purchase," etc.).

In some embodiments, the mobile computing device may record a geolocation (which is a location on the surface of the earth such as that detected by the global positioning system (GPS)). The application may associate the geolocation with a merchant and the geolocation of the mobile computing device be used to infer that the user was present at the merchant. The use of the geolocation may enable similar types of associations as when the user scans a tag associated with the merchant when visiting the merchant.

When the association is between the user and the inventory of the merchant, a later purchase of any item that is included in the inventory may be attributed to the merchant. However, there may be no record that the user actually interacted with or even was aware of the particular item from that inventory while the user visited the merchant. Therefore, the commission made available to the merchant may reflect this uncertainty (e.g., the commission may be lower than the commission based on the user scanning a tag specifically associated with a particular item). For example, when the association record is between the user, the merchant, and the merchant's inventory the merchant may receive a lower commission on a larger number of items than if the association record is with a specific single item.

In various embodiments, an online retailer or other seller may partner with the merchant and then direct customers to the merchant ("retail partner") so that the customer can benefit from services provided by the retail partner. In exchange, the online retailer or other seller may compensate the retail partner for the services performed by the retail partner. For example, an online retailer may provide information to refer a customer to a nearby retail partner that carries an item of interest to the customer.

In accordance with one or more embodiments, the retail partner may provide associates (e.g., sales staff, managers, etc.) with a mobile device application that allows the associates to identify customers that are interacting with an online retailer or other seller. The mobile device application of the retail partner may communicate with a mobile device application of the online seller to indicate a presence of the user and/or to facilitate providing a commission to the retail partner for services rendered to the customer, possibly including a commission for sales help performed to the user by the associate.

With any of the techniques mentioned above, the merchant receives attribution for providing a showroom that displays an item which is the same or similar to an item that the user ultimately purchases from another source. The other source that makes the sale may pay a commission to the merchant based on this association Illustrative Architecture FIG. 1 is a schematic diagram of an illustrative architecture 100 showing a user 102 and a mobile device 104 of the user 102 that may be present at a merchant 106 and interconnected with various other computing devices. The mobile device 104 may be a mobile phone, a notebook computer, a netbook, a tablet computing device, a personal digital assistant (PDA), an e-book reader, a digital media player, a personal gaming device, and the like. The merchant 106 may maintain one or more retail locations where the user 102 can browse and purchase items sold by the merchant 106. For example, the merchant 106 may be a record store, a bookstore, a department store, an electronics store, or the like. The merchant 106 may also be a merchant that does not primarily deal in sales of physical goods such as a merchant that primarily sells services. The merchant 106 may also rent or license the items.

An item 108 at the merchant 106 may have one or more of machine-readable tags 110 placed on or near the item. In some implementations, the tag 110 may be placed over or near an existing barcode or other type of tag that exists on the item 108 or on packaging for the item 108. The tag 110 may encode information representing the item 108 and the merchant 106. For example, information represented by the tag 110 may include an item number for the item 108 and a merchant identifier for the merchant 106. The tag 110 is illustrated here as a matrix barcode. However, this is but one illustrative form of a tag 110. The tag 110 may be implemented in any format that contains information in a machine-readable form such as printed matter (e.g., text read through optical character recognition), image-based codes (e.g., bar codes, QR Codes®, etc.), radio-transmitted codes (e.g., a radio frequency identifier (RFID) tag, etc.), and/or other types of tags (e.g., a near field communication (NFC) target, etc.).

The mobile device 104 may read the tag 110 by using a camera to take a picture of the tag 110 that is analyzed by software loaded on the mobile device 104 to extract information from the tag 110. Other types of tags may be read by appropriate components in the mobile device 104 such as an antenna that receives a signal from an NFC target.

The mobile device 104 may be connected to a network 112. The network 112 represents any type of communications network such as the Internet, a wide area network (WAN), a local area network (LAN), a telephone network, a cable network, a mesh network, a peer-to-peer network, and the like. The mobile device 104 may connect the network 112 through wireless technology such as wireless fidelity (Wi-Fi) or Bluetooth® radio signals. The mobile device 104 may also connect the network 112 in a wired implementation such as by using a telephone line or Ethernet cable.

Scanning the tag 110 may provide the mobile device 104 with information about the item 108. In some implementations, information such as information about the item 108 and the merchant 106 may be encoded in the tag 110 and read by software on the mobile device 104. In other implementations, the tag 110 may encode a link or address of a network-based source of information such as a universal resource indicator (URI) 114 of a page 116 displayed by the mobile device 104. The page 116 may be a visual display of electronic data, such a webpage, an item page, an interface of an application, or another interface or data displayed by the mobile device 104. Specialized software or a generalized web browser on the mobile device 104 may use the link encoded in the tag 110 to access the network-based source of information. In implementations in which the tag 110 encodes a URI 114, the URI 114 is itself may include information representing the item 108 and the merchant 106. In an example URI 114, the item 108 is represented by item number 3728 and the merchant 106 is represented by merchant identifier (ID) 117. The page 116 may show information about the item 108 such as pricing information for the item from a variety of sources and reviews or ratings of the item 108. The content of the page 116 may incentivize the user 102 to scan the tag 110 in order to obtain comparative pricing and review information. Thus, the act of scanning a tag 110 may be interpreted as suggesting that the user 102 is considering purchasing the item 108.

If the user 102 chooses to purchase the item 108 from the merchant 106, then the merchant 106 may use the tag 110 to process the transaction at a point-of-sale (POS) terminal. The point-of-sale terminal may access additional information encoded by the tag 110 that is interpreted by a computer system of the merchant 106. Alternatively, information that is included in the tag 110 for the mobile device 104 to scan may also be used by the point-of-sale terminal of the merchant 106 to process the transaction. For example, the item identifier (e.g., 3728) may be used by the merchant's point-of-sale system to identify the item 108.

One or more networked computing devices 118 also connected to the network 112 may serve the page 116 to the mobile device 104. The same or different networked computing devices 118 may also maintain account records for one or more users and one or more merchants. User accounts 120 may include information about the user 120 as well as other users. The information maintained in the user accounts 120 may be similar to information maintained by an e-commerce website or online retailer about customers such as shipping addresses, purchase history, and the like. Additionally, these user accounts 120 may include records which are generated each time a mobile device 104 scans a tag 110. The record generated when the mobile device 104 scans the tag may include the identity of the item 108 associated with the tag 110, the identity of the merchant 106 associated with the tag 110, and a time and date indicating when the tag was scanned.

Merchant accounts 122 include information about various merchants such as merchant 106. The information in the merchant accounts 122 for a particular merchant may include a merchant ID representing that merchant and/or a particular retail location of that merchant. Thus, the merchant ID may correspond with all stores of a particular company or with just one particular store. The merchant accounts 122 may also include an item inventory for the merchant 106 that identifies items for sale at the merchant 106. The item inventory may be generated by the merchant 106 supplying an inventory list to the networked computing devices 118. In some implementations, the inventory list may be generated if the merchant 106 uses the network computing devices 118 to generate tags for placing on its inventory. Additionally, the merchant accounts 122 may include records each time a tag associated with a particular merchant is scanned. Thus, the act is of the user 102 scanning the tag 110 with his or her mobile device 104 may create a record in both the user accounts 120 and/or the merchant accounts 122.

Since the tag 110 is also associated with one or more items (e.g., item 108) the identity of the one or more items represented by the tag 110 is also provided to the networked computing devices 118. In this example, the identity of item 108 may be represented by a corresponding item number 124 (e.g. item number 3728). With these three pieces of information, the networked computing devices 118 may create an attribution record 126 which identifies that the user 102 interacted with item 108 at the merchant 106. The attribution record 126 may be stored in the user account 120, the merchant account 122, and/or another location. This attribution record 126 allows a later purchase by the user 102 of another item corresponding with or related to item number 124 to be attributed to the merchant 106. The attribution may lead to the merchant 106 receiving a commission for a sale made by another entity.

Figure 2:
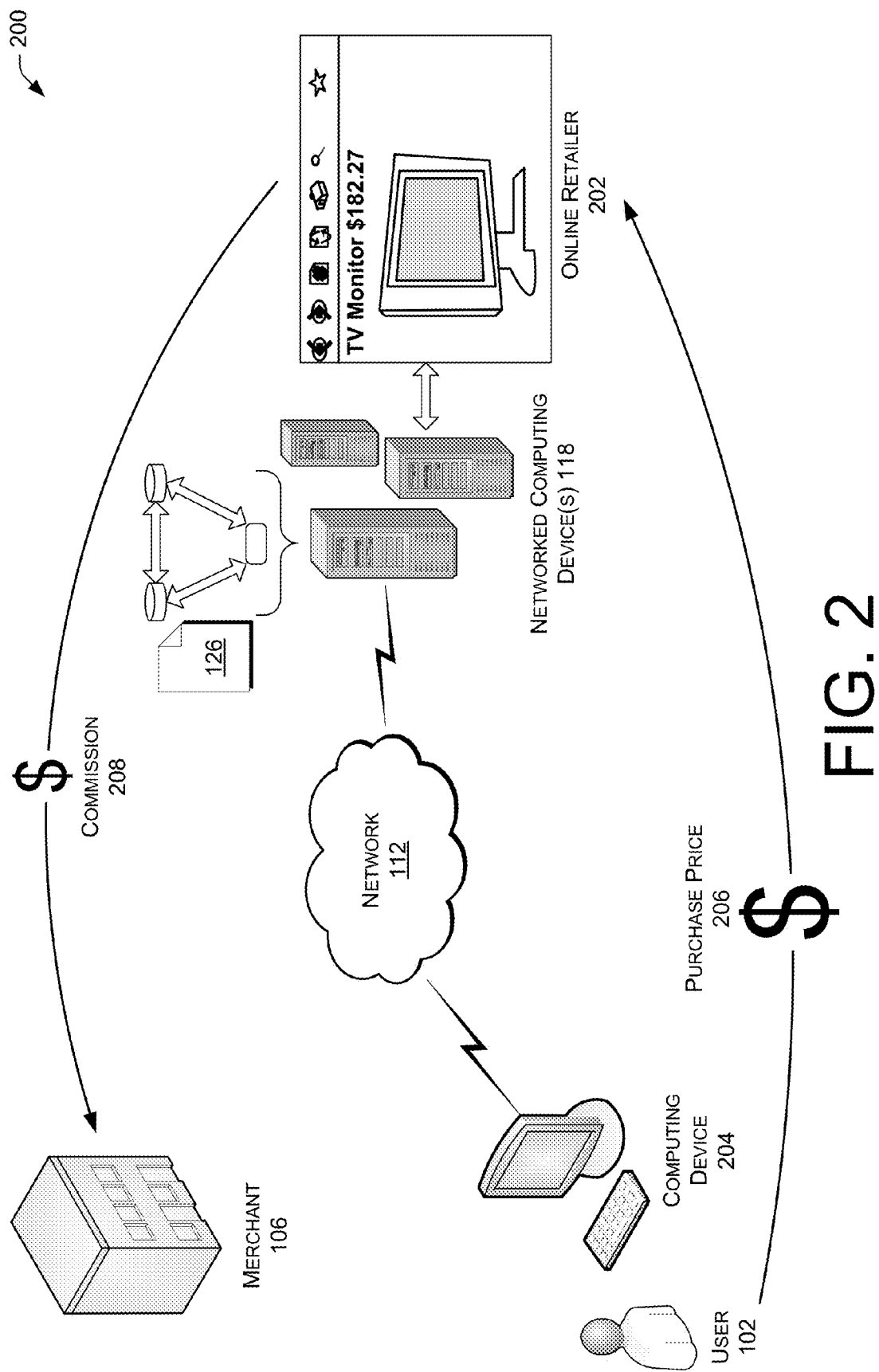
FIG. 2 is an example architecture that shows interconnectivity between various computing devices to enable a user to purchase an item from an online retailer and the online retailer to provide a commission to the appropriate merchant.

FIG. 2 is a schematic diagram of an illustrative architecture 200 showing interconnectivity between computing devices that enable the merchant 106 to receive a commission for a purchase made by the user 102 from an online retailer 202. If the user 102 does not purchase the item 108 from the merchant 106 the user 102 may instead purchase the item 108 from the online retailer 202 or another source. The user 102 may use a computing device 204 to make the purchase from the online retailer 202. In some implementations, the computing device 204 may be the mobile device 104. In other implementations, the computing device 204 may be different than the mobile device 104, such as a desktop computer, etc. the computing device 204 may be connected to the network 112 and access the online retailer 202 via the network 112.

The networked computing devices 118 may include web servers or other devices that support the online retailer 202. Thus, the networked computing devices 118 may include the online retailer 202, the computing devices that maintain the user accounts 120 and the merchant accounts 122, as well as the servers that provide a page in response to the mobile device 104 scanning the tag 110. However, each of these functions may be provided by a separate collection of networked computing devices independently controlled by different entities. For example, the online retailer 202 may be distinct from the networked computing devices 118 but exchange information with the networked computing devices 118 through the network 112 or another communication channel.

The user 102 pays a purchase price 206 to the online retailer 202 for the item 108. The purchase price 206 may be, but is not necessarily, less than the price that the item 108 is offered for sale by the merchant 106, thus providing motivation for the user 102 to make the purchase from the online retailer 202. Transactions processed by the online retailer 202 may be made available to the networked computing devices 118 either because the networked computing devices 118 are part of the online retailer 202 or because information is shared between the two systems. In order to purchase an item from the online retailer 202, the user 102 may access or log into an account with the online retailer 202. After logging into an account at the online retailer 202, it may be possible to recognize that the user 102 making a purchase from the online retailer 202 is the same user 102 that scanned the tag 110 at the merchant 106. The attribution record 126 generated in FIG. 1, includes the user accounts 120 from which the networked computing devices 118 can determine if this user 102 previously scanned the item 108 at the merchant 106 or any other merchant. Comparison of the transaction between the user 102 and the online retailer 202 with the attribution record 126 may determine if the merchant 106 should receive a commission 208 for the sale of the item 108.

The commission 208 may comprise any form of compensation, such as currency transferred to the merchant 106 or to another entity (e.g., a charity specified by the merchant 106), stored value at an account of the merchant 106 with the online retailer 202, or any other monetary or non-monetary form of compensation. The commission 208 may be based on the purchase price 206. The commission 208 may be a percentage of the purchase price 206 such as 1%, 5%, 10% etc. Depending on the agreement between the merchant 106 and the online retailer 202 the commission 208 may even exceed the purchase price 206.

Illustrative Computing Devices

Figure 3:
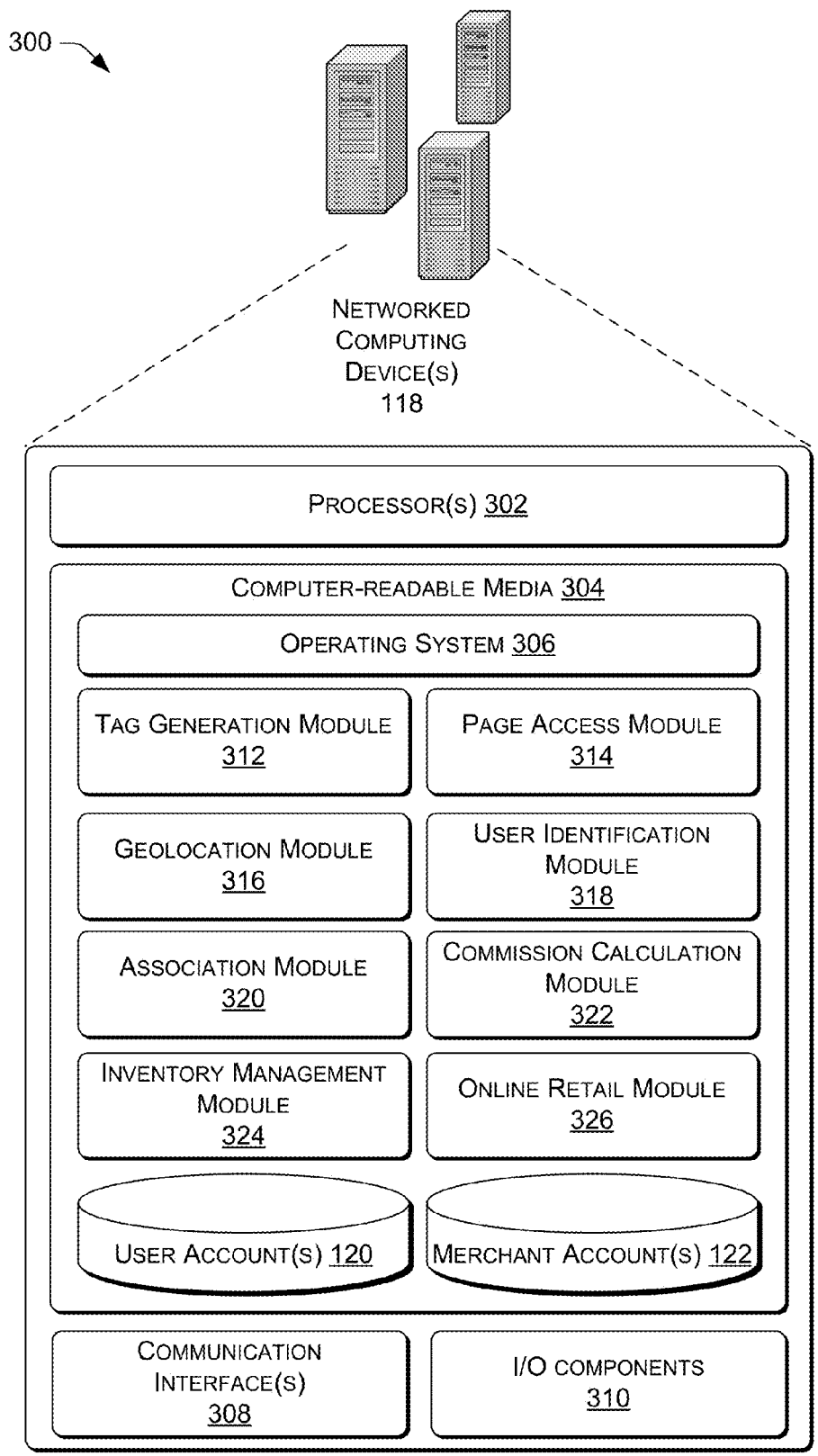
FIG. 3 is a block diagram of example components in the networked computing device(s) of FIGS. 1 and 2.

FIG. 3 is a schematic representation 300 of the networked computing devices 118 shown in FIGS. 1 and 2. The networked computing devices 118 may be one or more server computers, a mainframe, or other types of computing devices. In some implementations, the networked computing devices 118 may be implemented by a brick-and-mortar merchant such as the merchant 106 discussed above. In other implementations, the networked computing devices 118 may be implemented by an e-commerce website such as the online retailer 202.

The networked computing devices 118 comprise one or more processors 302 and computer-readable media 304. In some implementations, the computer-readable media 304 may be implemented in hardware or firmware. The computer-readable media 304 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by a processor. Computer-readable media 304 includes non-transitory media that is capable of storing information in formats other than transitory signals. The computer-readable media 304 may contain an operating system 306 for controlling other modules within the computer-readable media 304 as well as hardware of the networked computing devices 118.

The networked computing devices 118 may include one or more communication interfaces 308 for receiving and sending information. The communication interfaces 308 may communicatively couple the networked computing devices 118 to a communications network, such as network 112, using any conventional networking protocol or technology. The networked computing devices 118 may also include input-output components 310 for receiving input from human operators (e.g., a keyboard) and providing output (e.g., a monitor) to the human operators. The networked computing devices 118 may also store, in the computer-readable media 304, the one or more user accounts 120 and the one or more merchant accounts 122 shown in FIG. 1. However, these two memory stores may also be located elsewhere and accessed by the networked computing devices 118.

The computer-readable media 304 may include a tag generation module 312 that is configured to generate, responsive to receiving an identifier of an item from a merchant, information which, when encoded in a machine-readable tag, identifies the merchant and the item. This information allows the networked computing devices 118, or another system, to create machine-readable tags that present the encoded information when scanned by a device such as the mobile device 104 discussed above. Machine-readable tag generation module 212 may determine the pattern of a barcode or the frequency or specifications of an RFID tag to represent the underlying data. The tags may be created by another entity that simply creates the tags according to specifications provided by the machine-readable tag generation module 312.

The merchant may provide a list of items for which the merchant requests tags. The list provided by the merchant may include names, product numbers, and other identifiers related to the items. The machine-readable tag generation module 212 may translate or convert those identifiers into identifiers suitable for encoding in machine-readable tags. For example, the merchant may provide an international standard book number (ISBN) for a book and the machine-readable tag generation module 212 may determine the structure of the matrix barcode that includes a product identifier corresponding to the book. The machine-readable tag generation module 212 may also structure information for generating a tag so that the information also includes an indicator of the merchant at which the tag will be placed. If the merchant requests generation of the tag from the network computing devices 118, an identifier of the merchant may be included in the request and the machine-readable tag generation module 312 may use that identifier when creating instructions for making the tags.

The machine-readable tag generation module 312 may create a single code or sequence of data that can be represented as, for example, a barcode or a radio signal, that identifies both an item and a merchant. The code that represents both pieces of data may be two strings of data placed together such as a merchant identifier following a at item number. One example is the URI 114 shown FIG. 1. In other implementations, the codes for both the item and the merchant may be combined, such as with a hashing algorithm or other technique, to create a unique code that is different from either of the separate codes.

A page access module 314 may also be stored in the computer-readable media 304. The page access module 314 is configured to determine when a page associated with a merchant and associated with an item is accessed by a computing device. The computing device may be the mobile device 104 discussed above. When the page is accessed, for example in response to the user scanning a tag with his or her mobile device, the page access module 314 may create a record of that access that is stored in the user account 120, the merchant account 122, or elsewhere.

A geolocation module 316 may receive an indication of a location of the mobile device 104 on the surface of the earth. The geolocation may be received from the mobile device 104 itself, such as from a GPS component within the mobile device 104. Additionally or alternatively, the networked computing devices 118 may determine geolocation based on information received about the mobile device 104. For example, the geolocation module 316 may correlate a network access point that is communicating with the mobile device 104 with a specific geolocation of that mobile access point (e.g., the Wi-Fi hotspot of department store A is located at the geolocation of department store A).

A user identification module 318 is configured to identify a user associated with the mobile device. In some implementations, the mobile device may supply a unique device identifier that is correlated with a record to determine the identity of a user associated with that mobile device. For example a phone number or a subscriber identity module (SIM) card number from the mobile device may be submitted to a mobile telephone service provider to obtain an identifier for the user of that mobile device. When the mobile device is requesting a page, an identifier (such as an HTML cookie) on the mobile device can contain information that is accessed by a server providing the page and used to identify the user of the mobile device.

An association module 320, stored in the computer-readable media 304, is configured to create an association between a user, an item, and a merchant. The association may include the user identified by the user identification module 318. The item and the merchant may be identified by the page access module 314 based on the association between the accessed page, the item, and the merchant. In some implementations, the association may be stored in the user account 120 and/or the merchant account 122.

The computer-readable media 304 may also include a commission calculation module 322 configured to calculate a commission for the merchant when the user purchases at item from a source other than the merchant. Thus, the merchant may receive a payment upon sale of an item that is the same or similar to an item that the user interacted with at the merchant's brick-and-mortar location (physical location). The commission may be based on the sale price of the item or a fixed amount of funds available for the commission. For example, for a given item the commission may be 10% of the purchase price or alternatively a set sum of money such as $1.50. The commission actually received by a single merchant may vary between zero and the full commission amount that is available for the item.

An inventory management module 324, stored in the computer-readable media 304, is configured to add an item to an inventory record of the merchant when an identifier of the item is received from the merchant. The inventory record of the merchant may be stored in the merchant account 122. In some implementations, the inventory record is built by the merchant submitting a list of items that are each added to a corresponding inventory record for the merchant. Items may also be added to the inventory of the merchant when the merchant submits a request for the tag generation module 312 to generate information for a tag. For example, by submitting a one-dimensional bar code from an item to the networked computing devices 118, a merchant may receive both the information needed to generate a tag for the item and that item may also be added to an inventory of the merchant. When the merchant reports an item as sold, lost, destroyed, or otherwise taken out of inventory a corresponding record for that item may be removed from the inventory record by the inventory management module 324. In various embodiments, a determination of items offered for sale by the merchant 106 may be determined by using a lookup table that associates the items with the merchant.

An online retail module 326, stored in the computer-readable media 304, is configured to support e-commerce activity. In some implementations, the online retail module 326 may provide the functionality to generate item pages, process payments, and all the other activities performed by computer systems of an online retailer. In configurations in which the online retailer 202 is part of the networked computing devices 118, the online retail module 326 may include the modules and functionalities to create the online retailer 202. Payments processed by the online retail module 326 may provide the money from which commissions, as calculated by the commission calculation module 322, are paid to the merchant. In some instances, the online retail module may provide a referral to retail partners, which is discussed in detail with reference to FIGS. 7 and 8.

The computing device at the digital merchant 118 may also include additional modules within the computer-readable media 304 and/or hardware components other than those described herein.

Illustrative Processes

These processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 4:
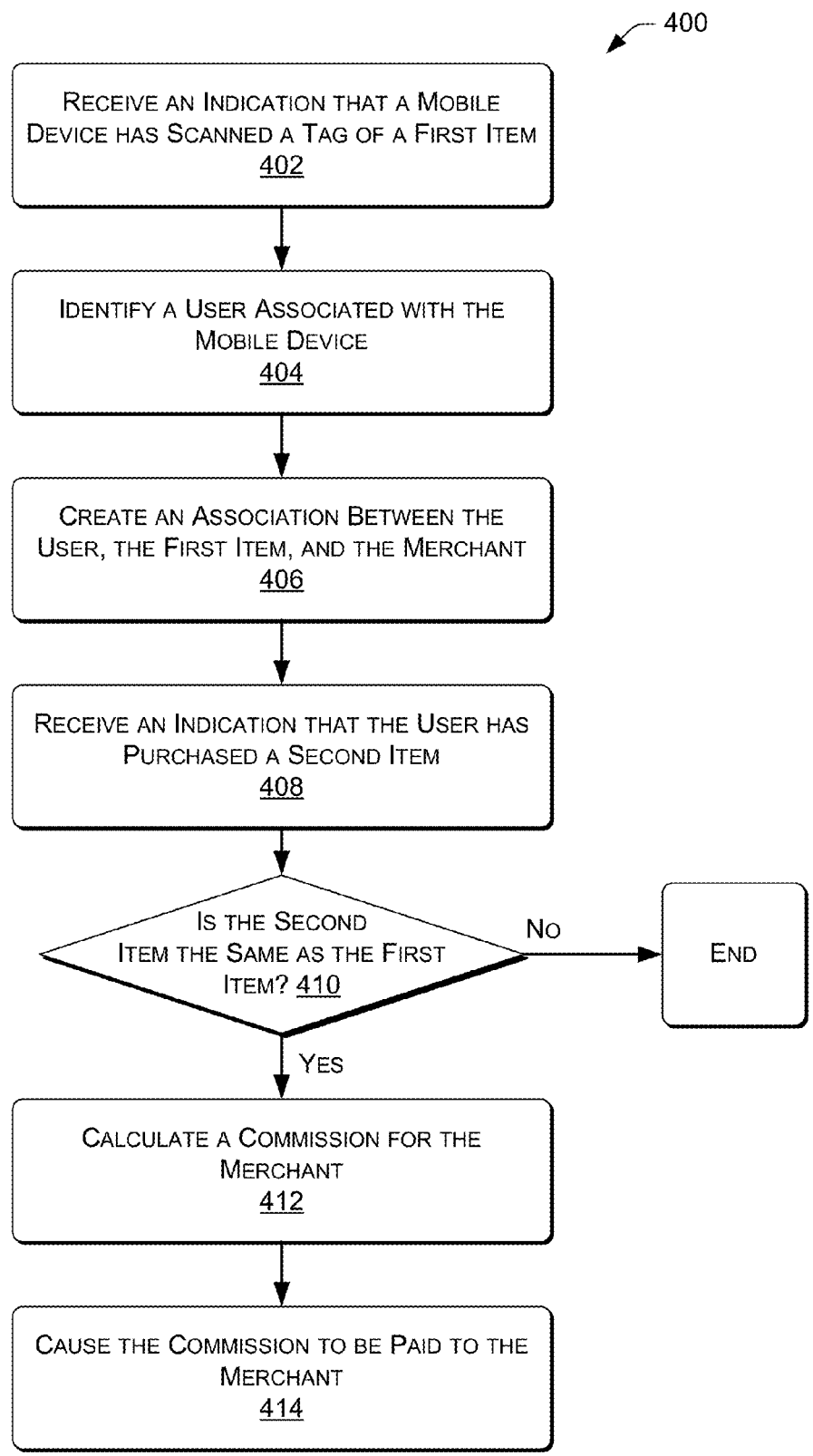
FIG. 4 is flow diagram of an example process for calculating a commission for a merchant when a user purchases the same or similar item that the user scanned at the merchant from a source other than the merchant.

FIG. 4 illustrates a process 400 for calculating a commission to a merchant. At 402, an indication that a mobile device has scanned a machine-readable tag of a first item is received. This indication may be received by the networked computing devices 118. The tag may be a linear barcode, a matrix barcode, a RFID tag, a NFC target, or any other format of tag that encodes information which can be read by an electronic device. In some implementations the tag may represent a URI that includes information identifying the first item and the merchant. One example of this type of URI is shown as URI 114 in FIG. 1.

At 404, a user associated with the mobile device is identified. The user may be identified, by the networked computing devices 118 or another system, with an identifier sent from the mobile device. The identifier may include a name of the user, an account number of the user (e.g., bank account number, credit card number, etc.) or an identifier of the mobile device itself such as a serial number, a phone number, a SIM card number, or the like. In some implementations, information identifying the user may be stored in an identifier (e.g., an html cookie) that is present on the mobile device. If there is no identifier on the mobile device, the user may first be directed to a page and asked to login to an account. Doing so may identify the user and allow placement of the appropriate identifier (e.g., cookie, etc.) on the mobile device.

At 406, an association is created between the user, the first item, and the merchant. The association may be the same or similar to the association 126 shown in FIGS. 1 and 2. This association may be available for comparison with any subsequent activity related to the user, the merchant, or the item.

At 408, an indication is received that the user has purchased a second item from a source other than the merchant. This indication may also be received, directly or indirectly, by the networked computing devices 118. The second item that the user purchased may be the same or different from the first item that was scanned at 402. Since the second item was not purchased from the merchant, the merchant may not receive any financial benefit from the sale of this item without a commission payment. The source that sells the second item may be another brick-and-mortar merchant, an online retailer, or another type of seller such as a consumer selling a used item.

At 410, it is determined if the second item is the same as the first item. Two distinct items may be the "same" if both items are manufactured or created to be substantially identical. Generally two items that are the same will have the same product identifier such as a model name or number, an ISBN for books, a universal product code (UPC), or the like.

If the first and the second items are the same, process 400 proceeds along the "yes" path to 412. If the first and second items are not the same, process 400 proceeds along the "no" path and ends.

At 412, a commission is calculated for the merchant based on the association. Identifying a purchase by the same user of a same or similar item from another source allows the merchant to receive attribution for showing, advertising, promoting, explaining, etc. the item to the user. This attribution can be recognized and rewarded by the commission. Calculation and payment of the commission can be separated so that one entity calculates a value for the commission (e.g., the networked computing devices 118) and another entity (e.g., a financial institution) makes the payment.

At 414, the commission is caused to be paid to the merchant. This may include actually paying the merchant as well as more attenuated acts such as sending instructions to make a payment (e.g., the networked computing devices 118 instructing a financial institution how much to transfer to an account of the merchant).

Figure 5:
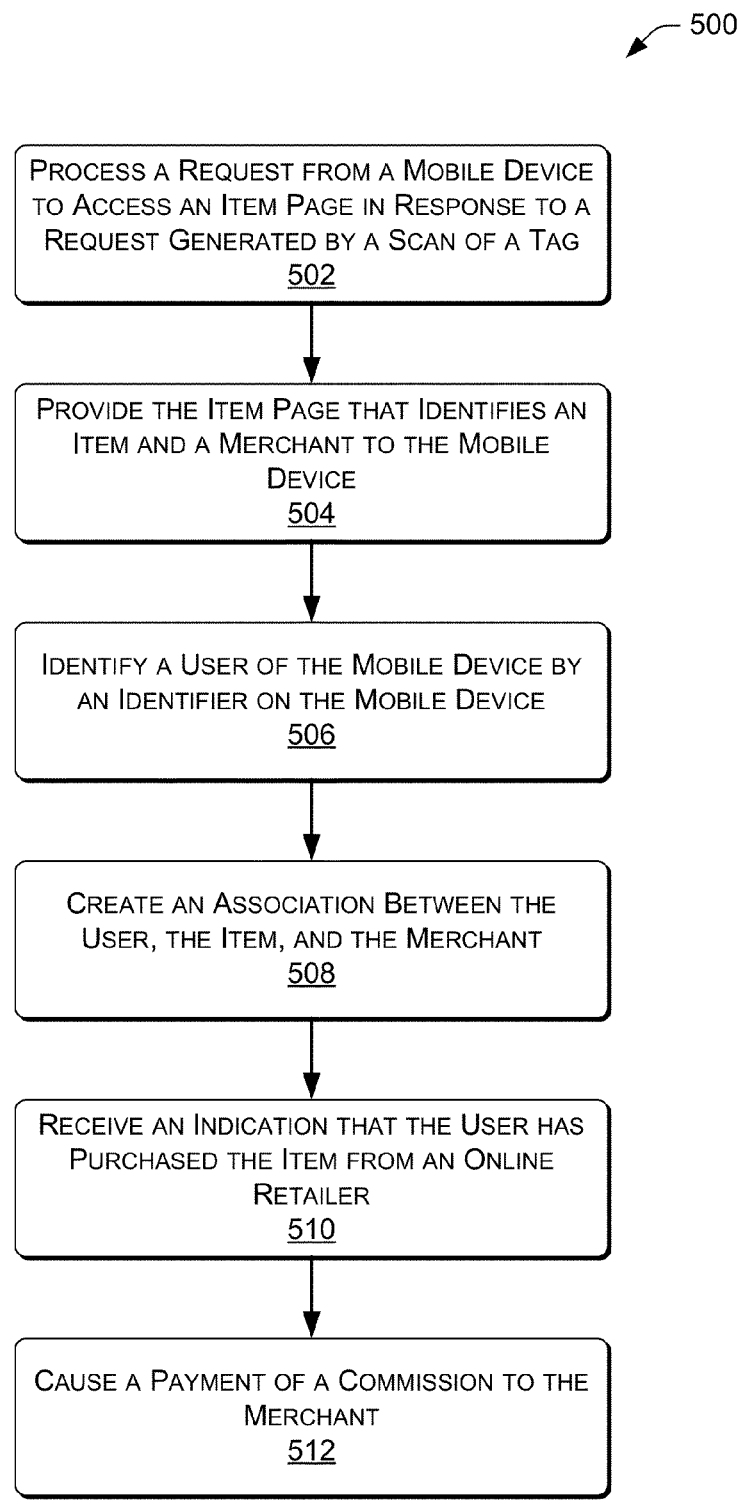
FIG. 5 is flow diagram of an example process for providing a commission to a merchant based on a user's access to an item page associated with an item and the merchant followed by the user's later purchase of the item from an online retailer.

FIG. 5 illustrates a process 500 for paying a commission to a merchant based on a page accessed by a mobile device. At 502, a request from a mobile device to access a page is processed. The request may be generated in response to the mobile device scanning a tag. In some implementations the tag may be a matrix barcode such as a QR Code®. The page may be a portion of a website of an online retailer. For example, the page may be a product page that corresponds to the item at the merchant to which the tag is attached. Thus, the page accessed by the mobile device in response to scanning the tag may be a page that provides information about the item such as the item's price, reviews, technical specifications, or other information. For example, user may scan the tag to perform a price check on the item and see if the item is available at a lower price from a source other than the merchant.

The tag may encode a URI that uniquely identifies the item and the merchant. For example, if the tag is implemented as a matrix barcode, information contained in the matrix barcode may be interpreted by the mobile device as a URI and software on the mobile device may automatically cause the device to request the page that corresponds to the URI. Since, in this example, the URI itself includes information about the item and the merchant, access to that page will communicate to an entity (e.g. the networked computing devices 118) that the mobile device has scanned a particular tag at a particular merchant.

At 504, the page that uniquely identifies the item and the merchant is provided to the mobile device. As discussed above, the page may uniquely identify the item and the merchant through the URI. However, in other implementations the URI itself may not uniquely identify the item when the merchant but it may direct browsing software to a page that is associated with the item and the merchant through another technique.

At 506, the user of the mobile device is identified by information stored in an identifier (e.g., cookie) on the mobile device. The identifier on the mobile device may be made available when the mobile device requests access to the page. The identifier may contain identifying information such as the user's name, the unique identifier of the user, an account number associated with the user, or other type of identifying data.

At 508, an association is created between the user, the item, and the merchant. The association may be based on the identifier provided by the mobile device to identify the user, the identifier of the item in the URI of the page, and the identifier of the merchant in the URI of the page. Thus, by accessing the particular page and providing the identifier, an association or linkage can be made between the person using the mobile device, the product associated with the tag at the merchant, and the identity of the merchant.

At 510, an indication is received that the user has purchased the item from an online retailer. The indication may be provided in real-time as the purchase is transacted over a network. Alternatively, the online retailer may submit purchase records periodically in batches such as hourly, daily, etc. The online retailer may be the same online retailer that provided the page at 504.

At 512, the payment of a commission to the merchant is caused or initiated based on the association created at 508. For example, the online retailer may use a record of the association to identify that this user previously scanned the tag of the same or similar item at the merchant before making this purchase. Therefore, the online retailer may pay the merchant a commission based on a prior agreement between the merchant and the online retailer.

If for example, process 500 is implemented by an entity other than the online retailer (e.g., the networked computing devices 118 are distinct from the online retailer 202 shown in FIG. 2) the act of causing the payment of the commission may include sending a message to the online retailer that the payment is due to the merchant.

Figure 6:
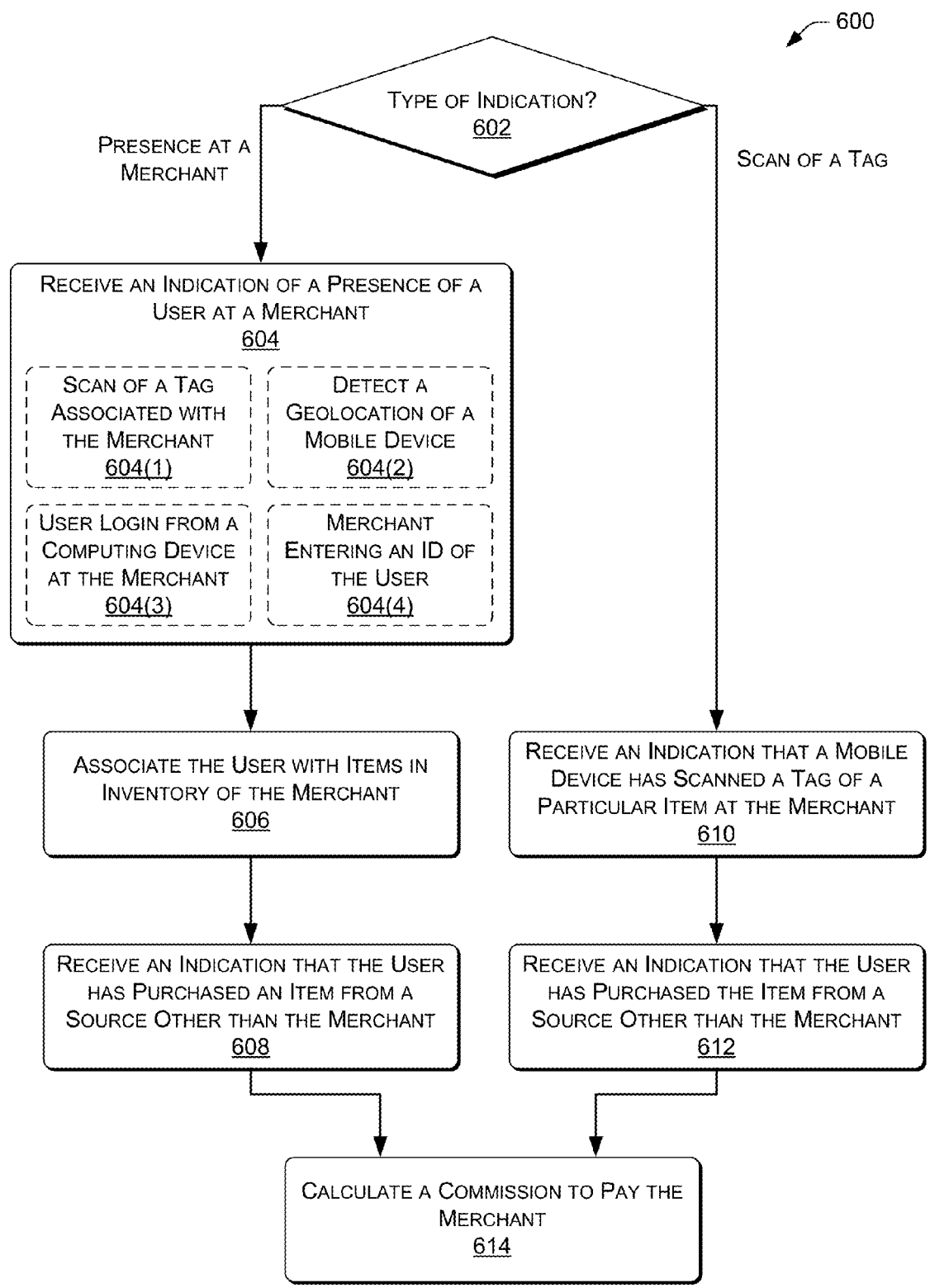
FIG. 6 is flow diagram of an example process for using an indication of the presence of a user at a merchant to create an association with the inventory of the merchant and then using that association to calculate a commission to pay the merchant when the user purchases an item that is in the inventory of the merchant from another source.

FIG. 6 illustrates a process 600 for calculating a commission to pay merchant based on an indication that a user was present at the merchant prior to the user purchasing an item in that merchant's inventory from another source. At 602, it is determined if the type of indication that shows the user as being present at the physical merchant location is a general indication of the user's presence or a specific indication generated in part by the scan of a tag. If the indication shows the user's presence at the merchant, process 600 proceeds to 604. However, if the indication is of a type generated by the scan of a tag, process 600 proceeds to 610.

At 604, an indication of the presence of the user at the merchant is received. This indication may be received by the networked computing devices 118. The indication of the user being present at the merchant may indicate that the user was at the merchant but may not indicate any specific items that the user viewed, scanned, or otherwise interacted with.

At 604(1), the indication may be generated by the mobile device associated with the user scanning a machine-readable tag that is associated with the merchant in general but not with any specific item at the merchant. For example, the merchant may post a large matrix barcode at a prominent location in the store and encourage customers to scan the barcode with their mobile devices. Similarly, the merchant may have a NFC target located near an entrance to the store and users may be encouraged to touch their mobile devices to the NFC target when entering or leaving the store. The encouragement for the user may be in the form of a discount or coupon that the user may receive after scanning these types of tags.

At 604(2), the indication may also be generated by detecting that the mobile device is at the merchant based on the geolocation of mobile device. Global positioning system (GPS) location determination, radio signal triangulation, Wi-Fi hotspot identification, or other techniques may be used to determine a geolocation of the mobile device on the surface of the earth. The geolocation may be compared to a map, known coordinates of the merchant, a signal or identifier of a Wi-Fi access point, etc. to determine that the mobile device is at the merchant. Thus, if the user of the mobile device grants permission for the device location to be used in this manner, the geolocation of the mobile device can be automatically detected and used to associate the user with the merchant without requiring scanning of a tag or other affirmative action by the user.

At 604(3), an indication used to identify the user's presence at the merchant may be generated by the user logging into an online account from a computing device physically located at the merchant. The user may access a computer terminal at the merchant and enter a username and password, provide a biometric identifier, etc. to log into one of his or her online accounts. The location of the login (i.e., the merchant) may be provided to the online account and this information is used to determine that the user was present at the merchant. Similar to the other techniques that require the user to actively do something in order to indicate his or her presence at the merchant, there may be a reward or incentive provided to the user for logging into an online account while at the merchant. This technique for determining the presence of the user at a merchant may work even for those users that do not have mobile devices.

At 604(4), identifying that the user is present at the merchant may also be performed by the merchant entering a user identifier provided by the user into an online account. This identifier may be provided from the user to the merchant without use of a networked computing device. For example, the user may simply tell the merchant his or her name, write an e-mail address on a piece of paper, put a business card into a fishbowl, etc. The merchant may then enter the identifier into an online account such as the merchant's online account with the networked computing devices 118. The merchant may enter the user identifier as it is received, for example by typing an e-mail address into a point-of-sale terminal. Alternatively, the merchant may enter the user identification into an online account at a later time such as at the end of a business day. For example, the merchant may transfer e-mail addresses received from a sign-in sheet or from business cards to the merchant's online account in one batch at the end of the day, once a week, etc.

At 606, some or all of the items in the inventory of the merchant are associated with the user. Since indication that the user was present at the merchant received at 604, may not indicate that the user interacted with any specific item, the user may be instead associated with the inventory of the merchant. In some implementations, the inventory may include all of the items known to be available for sale at the merchant during the time when the user was present at the merchant. For example, if the merchant maintains a real-time inventory of stock then the timing of the users present at the merchant combined with the status of the inventory at that same time may be used to determine which items are in the inventory for the purpose of the user's visit to the merchant. In some implementations, the inventory of the merchant includes items for which item identifiers are stored in an online account associated with the merchant. For example, the inventory that is used to form an association with the user is based on item records that are stored in the account of the merchant such as the merchant account 122 shown in FIGS. 1 and 3.

At 608, an indication is received that the user has purchased an item that is included in the inventory the merchant from a source other than the merchant. For example, the user may purchase the same or similar item from an online retailer after being present in a merchant that sells the item.

User presence at the merchant may also be determined when the user scans a tag associated with an item (not just the merchant in general) at the merchant as discussed above. At 610, an indication that a mobile device associated with the user has scanned a machine-readable tag identifying a particular item at the merchant is received. Thus, the scanning communicates that the user is present at the merchant and also communicates the user's interaction with a particular item.

At 612, an indication is received that the user has purchased the particular item from a source other than the merchant. For example, the user may have purchased the item from an online retailer and the online retailer may have provided that information to the networked computing devices 118. The indication received at 612 is different from the indication received at 608 because the indication received at 612 indicates that a specific item, rather than one of many items in an inventory, was purchased from another source.

At 614, a commission is calculated to pay the merchant. The commission may pay the merchant from a purchase price of the item that the user purchased. Thus, some aspects of calculating the commission for the merchant may be the same at 614 regardless of whether process 600 came from block 608 or block 612. The ultimate payment of the commission to the merchant may depend on how the user is associated with that item and the merchant.

Illustrative Referral to Retail Partner

Figure 7:
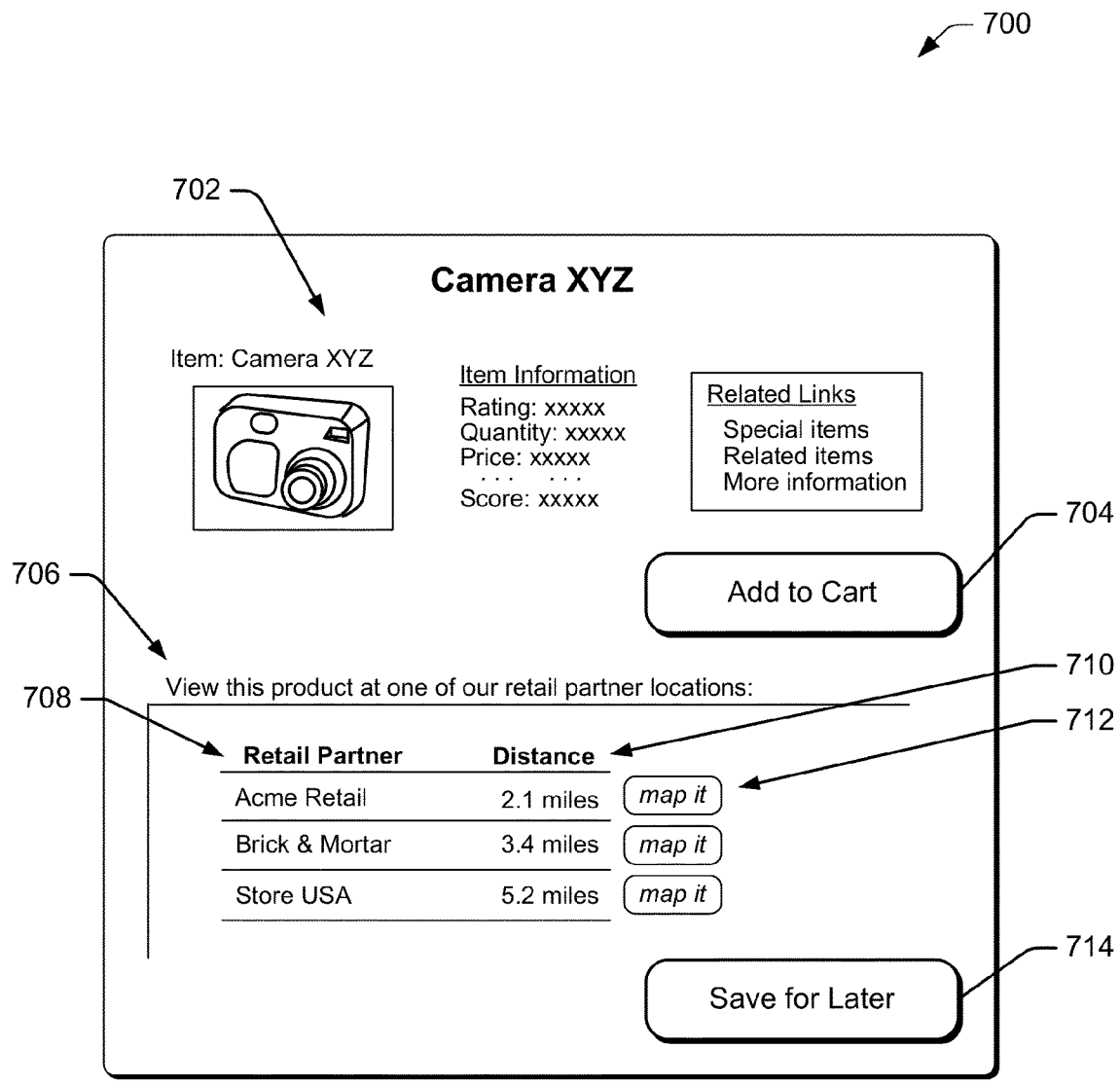
FIG. 7 is an illustrative user interface (UI) that provides a referral to a retail partner that may stock a particular item.

FIG. 7 is an illustrative user interface (UI) 700 that provides a referral to a retail partner that may stock and/or offer for sale a particular item. The UI 700 may be generated by the networked computing devices 118, which may be associated with an e-commerce website or online retailer that offers an item for sale. The UI 700 may provide an item section 702 that provides details about the item, including pictures of the item, a price, availability, user reviews, ratings, specifications, and/or other information. The UI 700 may include a command 704 to add the item to a cart or otherwise facilitate purchase of the item.

In accordance with some embodiments, the UI 700 may include a referral section 706. The referral section 706 may present one or more retail partners 708 that are associated with the e-commerce website or online retailer. For example, the retail partners may be entities that have formal agreements or otherwise have agreed, either explicitly or non-explicitly, to be included in the referral section 706. By being listed in the referral section 708, some of the retail partners may achieve additional sales when customers decide to purchase the item from the retail partner. In some instances, the retail partner may receive a commission, as described above, from the e-commerce website or online retailer when the customer visits the retail partner and then purchases the item from the e-commerce website or online retailer. The referral section 706 may include a distance value 710 that may approximate a distance between the user's location and the retail partner. The user's location may be an approximate location based on geolocation data, internet protocol (IP) address information, a user inputted location, etc. A map command 712 may provide a map that includes the retail partner's location and/or directions to the retail partner. In some instances, the referral section 706 may include other relevant data such as a price offered by the retail partner for the item, an inventory of the retail partner (e.g., available, back order, etc.), store hours, and/or other relevant information.

The referral section 706 may provide instructions to the customer, such as instructions on how to ensure the retail partner receives a commission (or other credit) when the customer visits the retail partner prior to purchasing the item from the e-commerce website or online retailer. The instructions may include directions on scanning a tag, using a particular mobile device application that uses geolocation, and so forth. The instructions may also ask the user to possibly refrain from some activities, such as visiting the retail partner during peak business hours, interacting with sales help, etc.

The UI 700 may include a command 714 to save the item for later. For example, the customer may use the command 714 to save the item for later when the customer decides to wait to purchase the item until the customer visits one of the retail partners.

Figure 8:
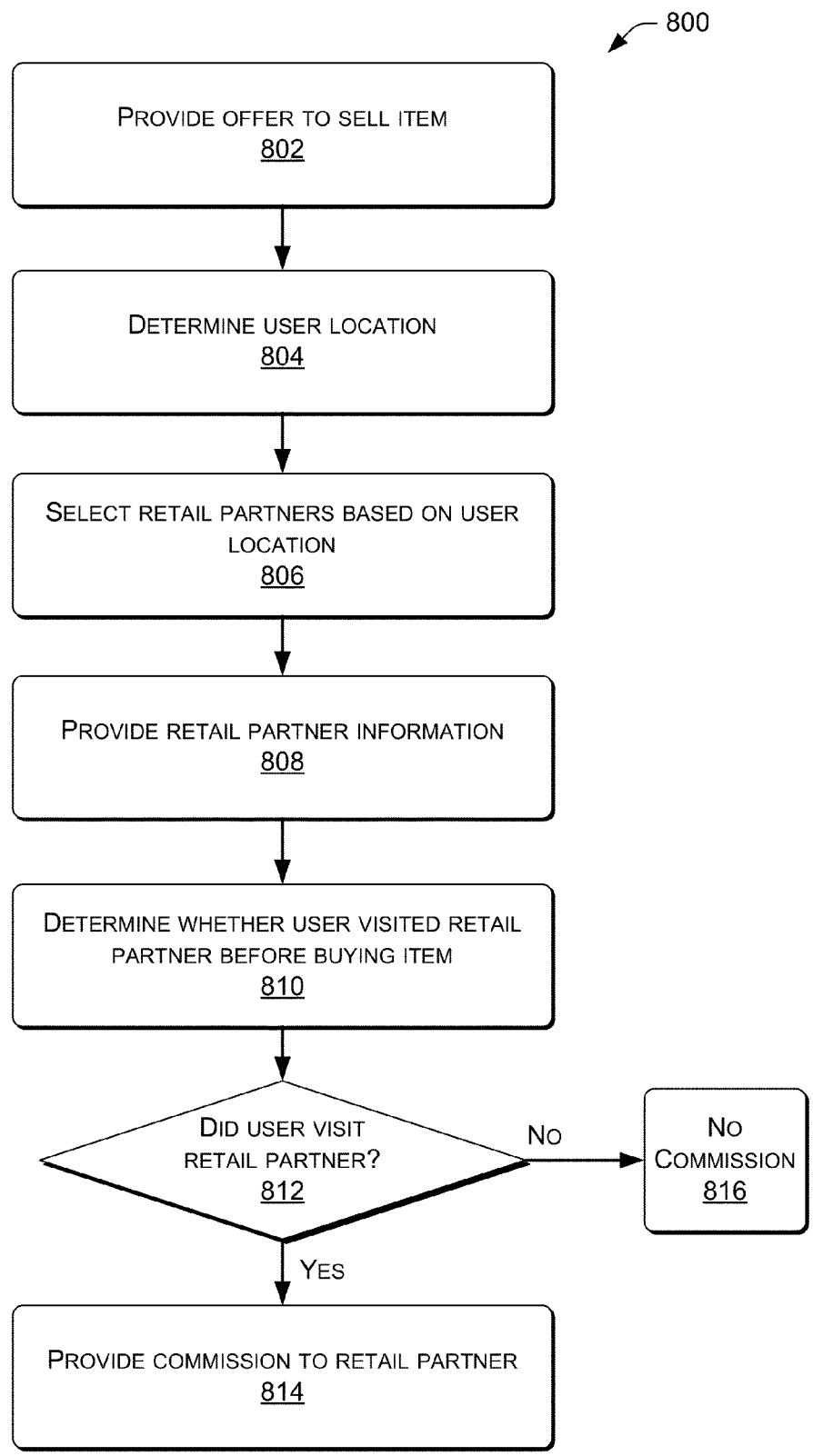
FIG. 8 is a flow diagram of an example process for providing a referral to a retail partner that may stock a particular item.

FIG. 8 is a flow diagram of an example process 800 for providing a referral to a retail partner that may stock a particular item. The process 800 may be used in conjunction with the UI 700 discussed above. The process 800 may be performed by the online retail module 326 of the networked computing devices 118.

At 802, the online retail module 326 may provide an offer to sell an item. The item may be a physical good or a service and may be offered for sale, for lease, for rent, for download, or for other uses via other arrangements. The online retail module 326 may provide the offer via a page, such as a webpage or dedicated application (e.g., "app"), communicated to the user via the mobile device 104 of the user 102.

At 804, the online retail module 326 may determine the location of the user. The location may be determined based on a location of the mobile device 104 (e.g. via geolocation), via user input (e.g., user entering location, zip code, etc.), via communication network data (e.g. IP address, etc.), and/or by other known techniques.

At 806, the online retail module 326 may select the retail partners 708 based on the user location determined at the operation 804. For example, the online retail module 326 may select the retail partners 708 having the closest proximity to the user's location, based on locations of stores of the retail partners. In some instances, other considerations may be used to select the retail partners, such as whether the retail partner sells the item offered at the operation 802, whether the retail partner has inventory of the item (e.g., stock on hand), and/or other factors.

At 808, the online retail module 326 may provide information to the user (e.g., via the UI 700, etc.) regarding the retail partner(s) determined at the operation 806. For example, the online retail module 326 may populate the referral section 706 of the UI 700 as shown in FIG. 7 to provide the user with information about the retail partner(s).

At 810, the networked computing devices 118 may determine whether the user 102 visited the retail partner before buying the item from the e-commerce website or online retailer. The networked computing devices 118 may determine the visit based on any of the various techniques described above, such as scanning of a tag, geolocation of the mobile device 104 associated with the user 102, user input, and/or input from the merchant. In some embodiments, the may use the information provided in the operations 806 and 808 in the determination performed at the operation 810. For example, the networked computing devices 118 may determine, from information from the mobile device 104, whether the mobile device 104 was present in a location associated with one of the retail partners selected at the operation 806.

At 812, the networked computing devices 118 may perform a decision operation based on the determination of whether the user visited a retail partner before buying the item offered for sale at the operation 802. When the networked computing devices 118 determines that the user visited the retail partner (following the "yes" route from the decision operation 812), then the process 800 may advance to an operation 814. At 814, the networked computing devices 118 may initiate payment of a commission to the retail partner or otherwise credit the retail partner for assisting in the sale of the item. When the networked computing devices 118 determines that the user did not visit the retail partner or fails to positively confirm a visit (following the "no" route from the decision operation 812), then the process 800 may advance to an operation 816. At 816, the networked computing devices 118 may not provide a commission to any retail partner. For example, the networked computing devices 118 may take no further action regarding commissions or credits when the determination at 812 concludes that the user did not visit a retail partner or the networked computing devices 118 did not positively confirm that the user visited a retail partner.

Illustrative Architecture with Associate Device

Figure 9:
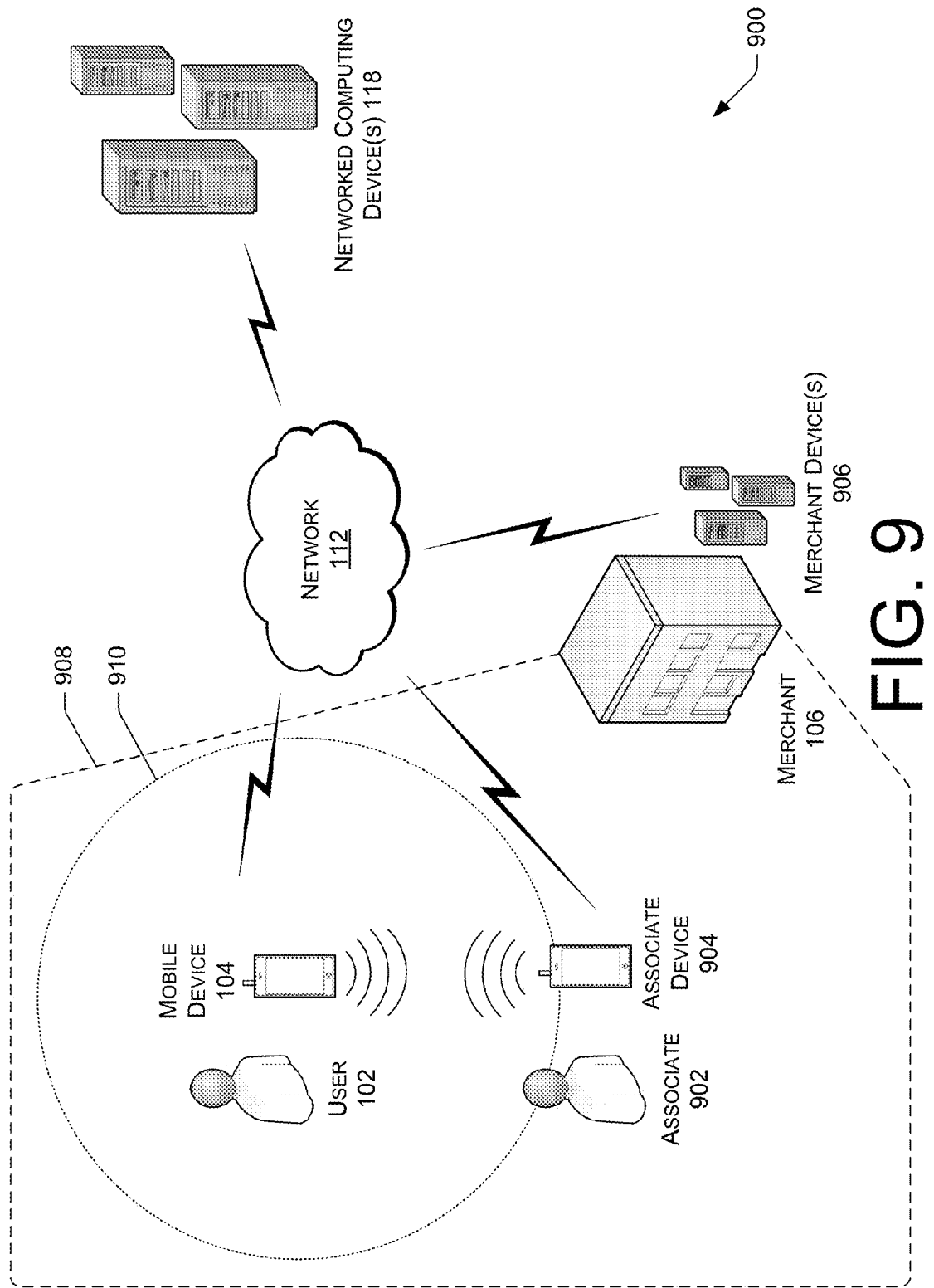
FIG. 9 is another example architecture that shows interconnectivity between various computing devices to enable tracking of user interaction with some merchants and purchases from different merchants.

FIG. 9 is another example architecture 900 that shows interconnectivity between various computing devices to enable tracking of user interaction with some merchants and purchases from different merchants. The architecture 900 includes some computing devices that were previously described and included in the architecture 100, such as the mobile device 104 and the networked computing devices 118. Additional computing devices may be included in the architecture 900 as provided below, which may facilitate additional functionality as described with reference to FIGS. 10-12.

In accordance with various embodiments, the architecture 900 may include an associate 902 and an associate device 904. The associate 902 may be an employee or agent of the merchant 106. For example, the associate 902 may be a sales clerk, a supervisor, a manager, and/or another employee/agent of the merchant 106. The associate device 904 may be a mobile phone, a notebook computer, a netbook, a tablet computing device, a personal digital assistant (PDA), an e-book reader, a digital media player, a personal gaming device, and the like. In some instances, the associate device 904 may be a simple receiver, transmitter and/or transceiver that can exchange (uni-directionally or bi-directionally) a signal with the mobile device 104. For example, the associate device 904 may be a specialized device that is configured to perform a specific task, such as detect presence of the mobile device 104 and/or other tasks as discussed herein.

The architecture 900 may also include merchant devices 906 that are associated with the merchant 106. The merchant devices 906 may be servers or other computing devices that may be implemented in a distributed or non-distributed configuration. The merchant devices 906 may be at least partly maintained by another entity, such as implemented in a cloud computing services environment or other distributed computing environment. The merchant devices 906 may communicate with at least the associate device 904 as discussed herein.

FIG. 9 further shows a merchant boundary 908, which may be associated with the merchant 106 and defined by the perimeter of the merchant's physical (brick and mortar) store location (e.g., inside the store, near the store, etc.), and a mobile device boundary 910, which may be defined by a distance from the mobile device 104. The merchant boundary 908 may be used, in part, to determine whether the user 102 (or mobile device 104) visited the merchant. For example, the merchant boundary 908 may be defined by GPS coordinates, a particular IP address, and/or other data that, when received by the mobile device 104, locates the mobile device at the merchant's location. This location information may be used to provide a commission to the merchant 106 as discussed above.

The mobile device boundary 910 may be defined by a distance from the mobile device 104, where the distance is associated with a broadcast range of a signal transmitted by the mobile device 104. The boundary 910 may be defined by a predetermined signal strength of the signal transmitted by the mobile device 104. The signal may be transmitted when the mobile device 104 is using an application to communicate with the networked computing devices 118 (such as when purchasing or viewing the item via the networked computing devices 118) and/or at other times. For example, the mobile device 104 may emit an active signal via a short range communications (SRC) transmitter (e.g., near field communication (NFC) transmitter, etc.). The emitting may be caused by the application run by the mobile device 104 and associated with the networked computing devices 118. Another device (e.g., the associate device 904, etc.) that is within the mobile device boundary 910 and that supports recognition of the SRC signal may receive and process the SRC signal. However, when the other device is outside of the mobile device boundary 910, the other device may be unable to receive the signal. In some embodiments, the mobile device boundary 910 may be determined by passive communications, such as those using passive radio frequency identifiers (RFIDs). The mobile device boundary 910 may be sized or tailored based on signal strength of the signal from the mobile device 104, or the signal from another device when the mobile device 104 uses passive communication techniques. For example, a radius of the mobile device boundary 910 may be tailored to a typical distance between two people that are talking to one another during a typical conversation (e.g., two to four feet, etc.). In some instances, the radius of the mobile device boundary 910 may also be tailored to a typical size of the merchant store, which may enable a store-level device (e.g., an associate device having a fixed location in the store as a store-level device, etc.) to detect presence of the mobile device 104. As another example, the associate device may be associated with a portion or section of the merchant's physical location, such as a particular department (e.g., audio/video department, appliances department, etc.) of subdivision thereof In various embodiments, the associate device 904 may communicate with the mobile device 104 when the associate device 904 is within the mobile device boundary 910. Communications between the mobile device 104 and the associate device 904 within the mobile device boundary 910 may be used to provide additional functionality to the techniques described above. For example, the networked computing devices 118 may use the presence of these communications to determine or assume that the user 102 received help from the associate 902, which may be used to determine an amount of the commission provided to the merchant 106 after the user 102 purchases the item from the e-commerce website or online retailer. In some instances, an elapsed time of the communications may be used to determine whether the user 102 received help from the associate (e.g., elapsed time reaches or exceeds a threshold amount of time). The presence of the communications may be used to inform the associate of the user's status, which may help the associate better assist the user. For example, the associate 902 may decide to assist or not to assist the user 102 based on this information. The presence of the communications may also be used to help the associate identify recommendations for the user 102. For example, the merchant 106 may be able to recommend and/or provide complementary items and/or services for sale to the user 102 that are unavailable by the e-commerce website or online retailer, such as warranty services, repairs, installations, accessories, and/or other services and/or items. In some instances, the recommendations may be provided to the associate device 904 via communications with the merchant devices 906.

As an example, the user 102 may enter the brick and mortar location of the merchant 106 to view an item that the user is considering purchasing from the e-commerce website or online retailer. The user 102 may carry the mobile device 104, which transmits a NFC signal covering the mobile device boundary 910 (area) around the mobile device 104. The user 102 may be approached by the associate 902 that carries the associate device 904. As the associate 902 approaches the user 102, the associate device 904 may receive the NFC signal from the mobile device 104 once the associate device 904 enters the mobile device boundary 910. The associate device 904 may then indicate a presence of the received signal to the associate 902, such as via a message that indicates that the user 102 is viewing the product during a showroom type visit to the merchant 106. The associate 902 may then decide whether or not to assist the user 102, offer other services/items to the user, or take other action. Meanwhile, the mobile device 104 (or possibly the associate device 904) may transmit an indication of the communications to networked computing devices 118, which in turn may provide a commission to the merchant 106. The commission may be valued based at least in part on the communications between the mobile device 104 and the associate device 904, among other factors. The following flow diagrams provide additional detail about the communications between the various computing devices.

In some embodiments, proximity of the associate device 904 to the mobile device 104 may be determined using geolocation information from each of the respective devices. In this situation, the devices may report their respective geolocations to the networked computing devices 118 or another centralized device. The networked computing devices 118 may then use the geolocation information to determine when the respective devices are within a threshold distance from one another. Thus, the geolocation data may be used as a substitute or enhancement of the SRC communications between the mobile device 104 and the associate device 904 to simulate or create the mobile device boundary 910.

Figure 10:
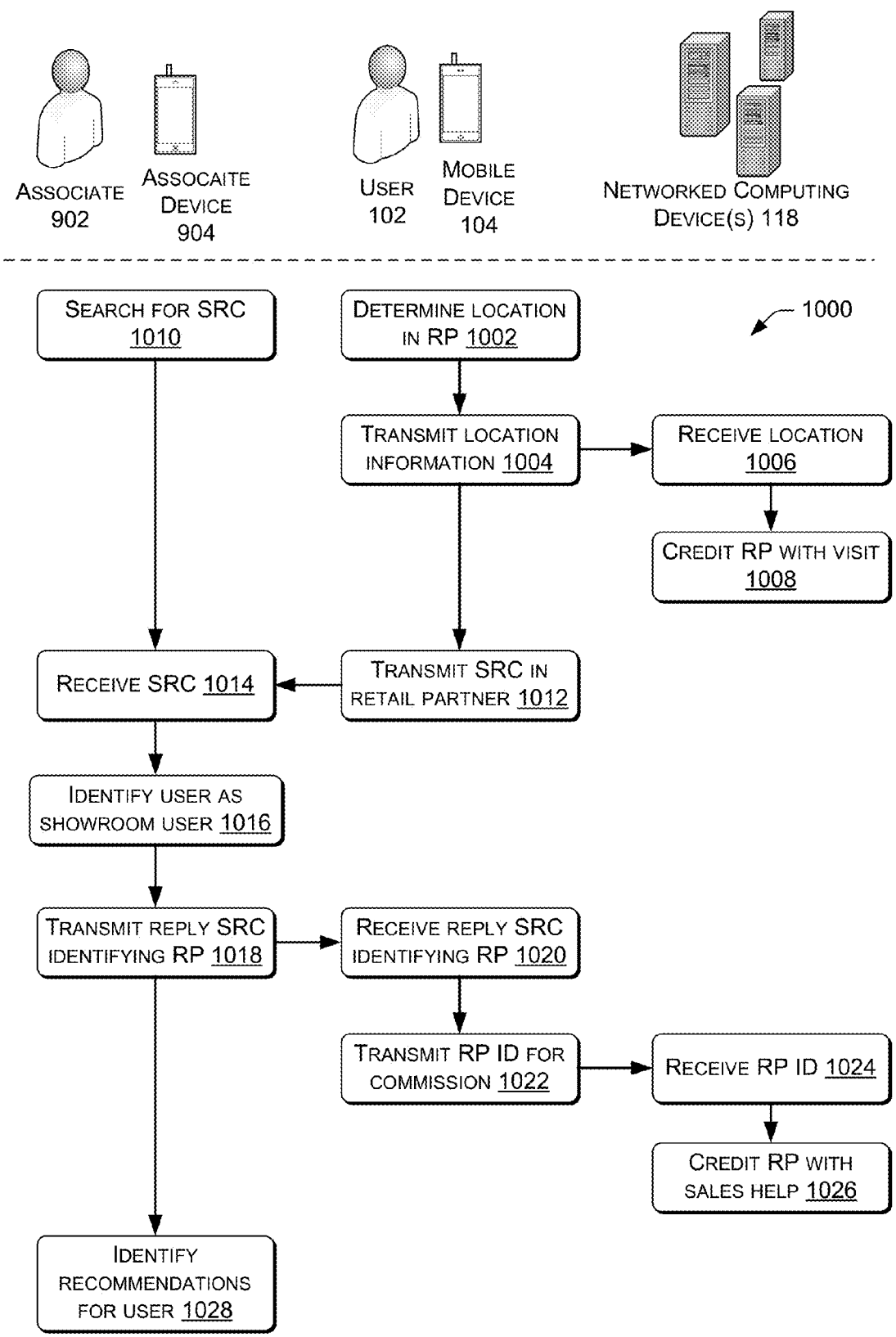
FIG. 10 is a flow diagram of an example process for identifying a user's presence at a merchant's location and crediting the merchant for performing services for the user.
Figure 11:
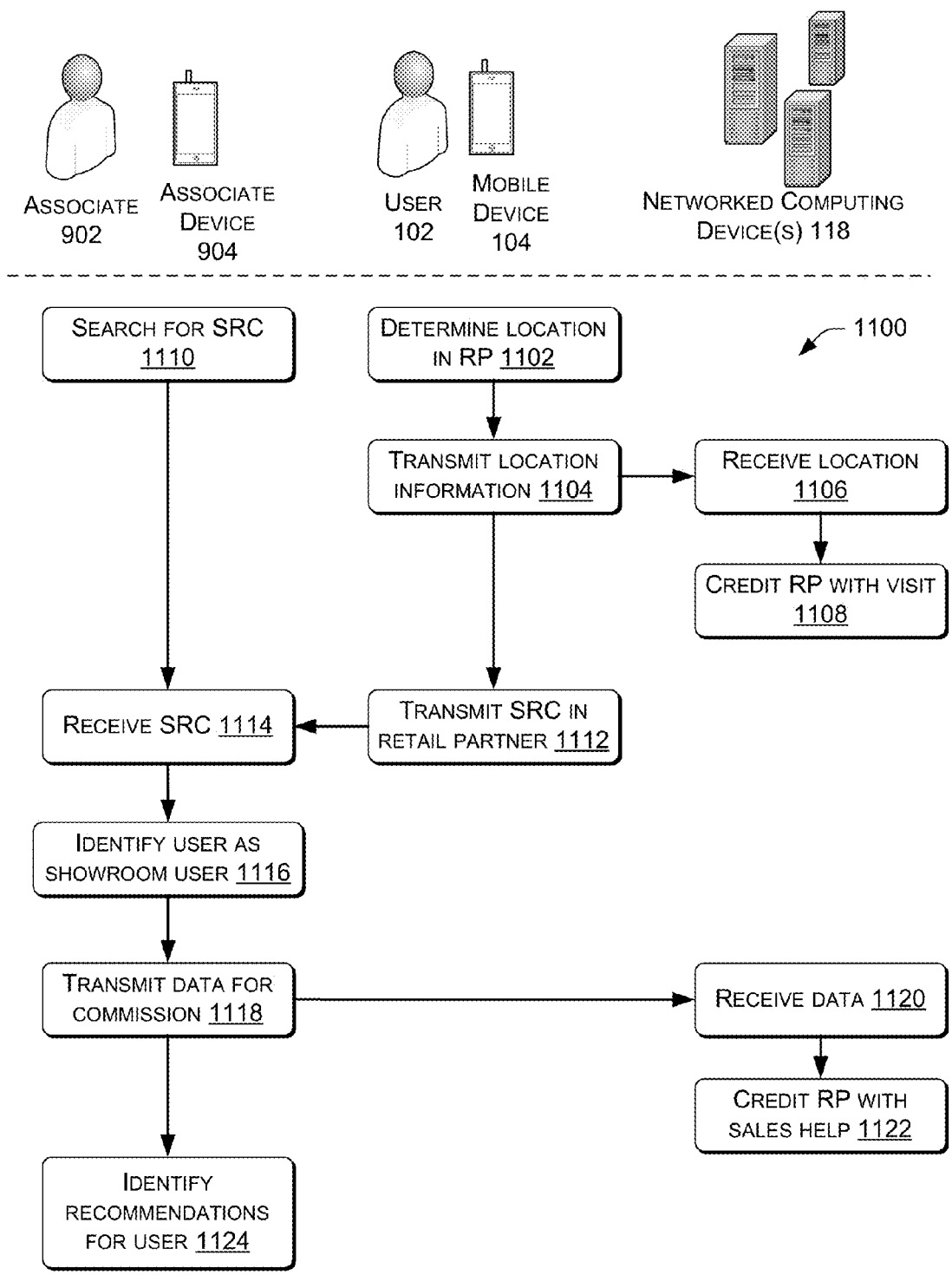
FIG. 11 is a flow diagram of another example process for identifying a user's presence at a merchant's location and crediting the merchant for performing services for the user.

FIGS. 10 and 11 are example processes for identifying a user's presence at a merchant's location and crediting the merchant for performing services for the user. The processes are described with reference to the architecture 900 shown in FIG. 9. These processes discussed below are each illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 10 shows an example process 1000 where the mobile device 104 communicates with the associate device 904 and then the mobile device 104 transmits a signal to the networked computing devices 118 indicating an occurrence of the communication between the mobile device and the associate device.

At 1002, the mobile device 104 may determine a location of the mobile device at the brick and mortar location of the retail partner (RP) (e.g., the merchant 106). The location may be determined by any of the techniques described herein, such as by scanning a tag associated with the location, via geolocation, and/or via other discussed techniques.

At 1004, the mobile device 104 may transmit the location information to the networked computing devices 118. At 1006, the networked computing devices 118 may receive the location information, which may be associated with the retail partner. At 1008, the networked computing devices 118 may credit the retail partner with the visit, which may then be used to initiate providing the commission to the retail partner after the user purchases the item from the e-commerce website or online retailer as discussed above.

Meanwhile, at 1010, the associate device 904 may be searching for an SRC signal, which may indicate presence of the user 102 and mobile device 104 in the brick and mortar location of the retail partner.

At 1012, the mobile device 104 may transmit the SRC in the brick and mortar location of the retail partner. As discussed with reference to FIG. 9, the SRC may create the mobile device boundary 910. At 1014, the associate device 904 may receive or detect the SRC after the associate device 904 enters the mobile device boundary 910 (e.g., after associate 902 approaches the user 102, etc.). The direction of communication between the mobile device 104 and the associate device 904 may be made in either direction or may be bi-directional. At 1016, the associate device 904 may identify the user 102 as a showroom type user based on the receipt of the SRC signal from the mobile device 104.

At 1018, the associate device 904 may transmit a response to the mobile device 104, possibly via another SRC, to identify the retail partner and presence of the associate 902. At 1020, the mobile device 104 may receive the response from the associate device 904. At 1022, the mobile device 104 may transmit an identifier of the retail partner (merchant 106) to the networked computing devices 118 for commission purposes and/or for other purposes. At 1024, the networked computing devices 118 may receive the identifier of the retail partner. At 1026, the networked computing devices 118 may credit the retail partner with providing sales help. The credit may be based in part on an assumption that the user 102 received assistance from the associate 902, who was within the mobile device boundary 910, and thus within speaking distance from the user 102. The credit may be a commission as discussed above.

Meanwhile, following the operation 1016 or 1018, the associate device 904 may identify or generate recommendations, 1028, which may be used by the associate to assist the user 102. The recommendations may include, for example, suggestions of complementary items or services which may be offered to the user 102 during the user's visit to the brick and mortar location of the retail partner.

FIG. 11 shows an example process 1100 where mobile device 104 communicates with the associate device 904 and then the associate device 104 transmit a signal to the networked computing devices 118 indicating the communication between the mobile device and the associate device.

At 1102, the mobile device 104 may determine a location of the mobile device at the brick and mortar location of the retail partner (RP) (e.g., the merchant 106). The location may be determined by any of the techniques described herein, such as by scanning a tag associated with the location, via geolocation, and/or via other discussed techniques.

At 1104, the mobile device 104 may transmit the location information to the networked computing devices 118. At 1106, the networked computing devices 118 may receive the location information, which may be associated with the retail partner. At 1108, the networked computing devices 118 may credit the retail partner with the visit, which may then be used to initiate providing the commission to the retail partner after the user purchases the item from the e-commerce website or online retailer as discussed above.

Meanwhile, at 1110, the associate device 904 may be searching for an SRC signal, which may indicate presence of the user 102 and mobile device 104 in the brick and mortar location of the retail partner.

At 1112, the mobile device 104 may transmit the SRC in the brick and mortar location of the retail partner. As discussed with reference to FIG. 9, the SRC may create the mobile device boundary 910. At 1114, the associate device 904 may receive or detect the SRC after the associate device 904 enters the mobile device boundary 910. The direction of communication between the mobile device 104 and the associate device 904 may be made in either direction or may be bi-directional. At 1116, the associate device 904 may identify the user 102 as a showroom type user based on the receipt of the SRC signal from the mobile device 104. The SRC may include information about the user 102, the mobile device 104, and/or other data, which may be encrypted.

At 1118, the associate device 904 may transmit an identifier of the retail partner (merchant 106) to the networked computing devices 118 for commission purposes and/or for other purposes. The transmission may include at least some additional information included in the SRC received from the mobile device 104, such as information about the user 102, the mobile device 104, and/or other data, which may be encrypted. At 1120, the networked computing devices 118 may receive the identifier of the retail partner. At 1122, the networked computing devices 118 may link the communication from the associate device 904 to the user 102 and/or the mobile device 104. The linking may be performed by information in the transmission from the associate device 904, time-based data from the mobile device 104 (e.g. from the operation 1106), which identifies the mobile device 104 as being in the location of the retail partner, or via other techniques. The networked computing devices 118 may then credit the retail partner with providing sales help. The credit may be based in part on an assumption that the user 102 received assistance from the associate 902, who was within the mobile device boundary 910, and thus within speaking distance from the user 102.

Meanwhile, following the operation 1116 or 1118, the associate device 904 may identify or generate recommendations, 1124, which may be used by the associate to assist the user 102. The recommendations may include, for example, suggestions of complementary items or services which may be offered to the user 102 during the user's visit to the brick and mortar location of the retail partner.

Figure 12:
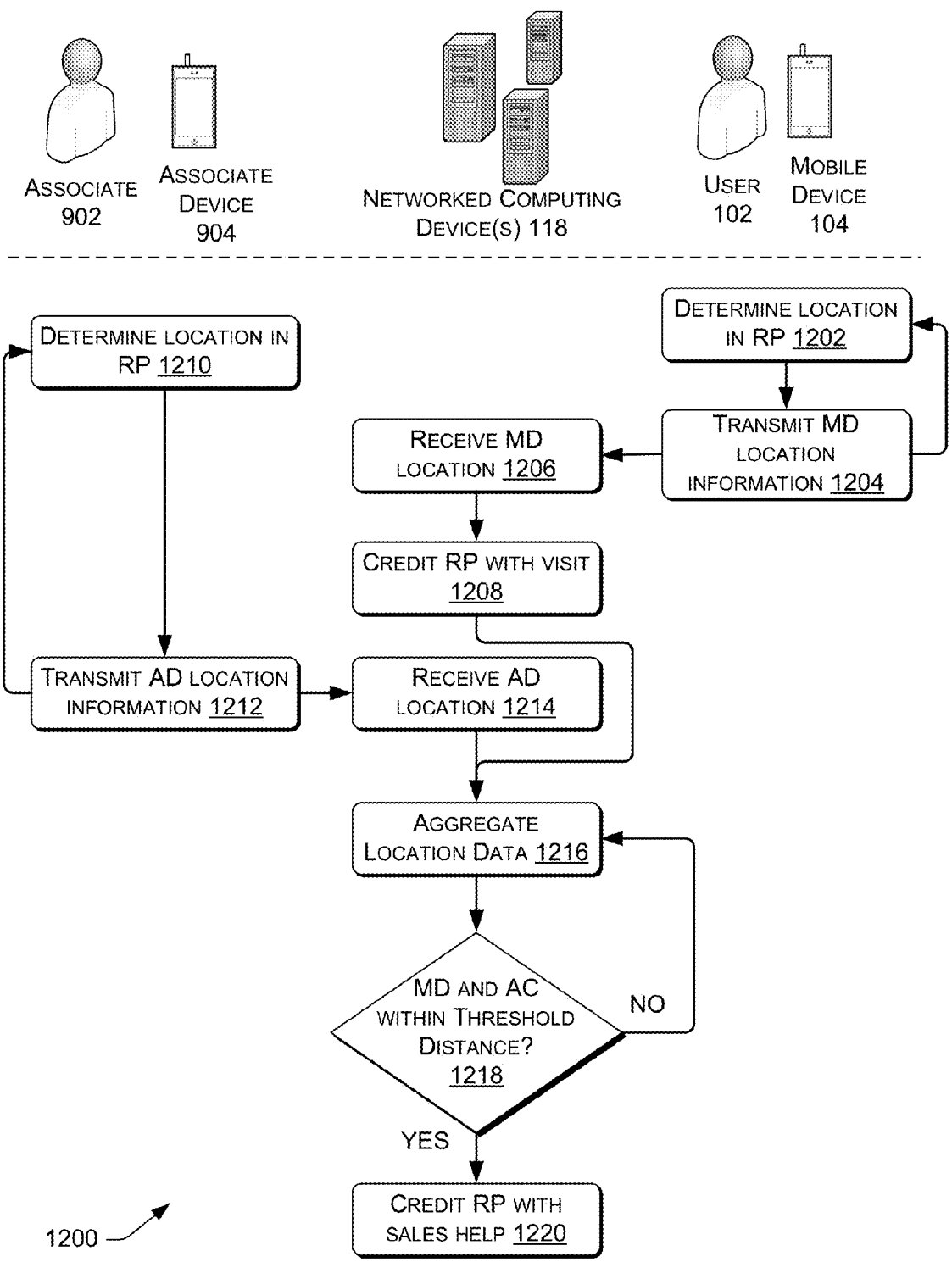
FIG. 12 is a flow diagram of example process for identifying a user's presence at a merchant's location and crediting the merchant for performing services for the user using geolocation information.

FIG. 12 is a flow diagram of example process 1200 for identifying a user's presence at a merchant's location and crediting the merchant for performing services for the user using geolocation information.

At 1202, the mobile device 104 may determine a location of the mobile device within a specific location within the brick and mortar location of the retail partner (RP) (e.g., the merchant 106). The location may be determined by any of the techniques described herein, such as by scanning a tag associated with the location, via geolocation, and/or via other discussed techniques.

At 1204, the mobile device 104 may transmit the location information to the networked computing devices 118. At 1206, the networked computing devices 118 may receive the location information, which may be associated with the retail partner. At 1208, the networked computing devices 118 may credit the retail partner with the visit, which may then be used to initiate providing the commission to the retail partner after the user purchases the item from the e-commerce website or online retailer as discussed above.

Meanwhile, at 1210, the associate device 904 may determine a location of the associate device within a specific location within the brick and mortar location of the retail partner (RP) (e.g., the merchant 106). The location may be determined by any of the techniques described herein, such as via geolocation, using RFID tags associated with locations, and/or via other discussed techniques.

At 1212, the associate device 904 may transmit the location information to the networked computing devices 118. At

1214, the networked computing devices 118 may receive the location associate device information. The operations 1210-1214 may be looped and may occur repeatedly, in intervals, and so forth. Similarly, the operations 1202-1206 may be looped and may occur repeatedly, in intervals, and so forth.

At 1216, the networked computing devices 118 may aggregate the location data from the operations 1214 and 1206 to determine respective locations of the associate device 904 and the mobile device 104 at a particular point in time or threshold range of time.

At 1218, the networked computing devices 118 may determine whether the mobile device 104 and the associate device 904 are within a threshold distance from one another. When the devices are within the threshold distance (following the "yes" route from the decision operation 1218), then the networked computing devices 118 may credit the retail partner with sales help at 1220. In some instances, the determination 1218 may include a time element to determine whether the threshold distances was achieved for a threshold amount to time (indicative of help) rather than a sampling error. When the devices are not within the threshold distance (following the "no" route from the decision operation 1218), then the process 1200 may loop back to the operation 1216, which may include new data from updated location information from the operations 1206 and 1214.

In some embodiments, the networked computing device 118 may communicate back to the associate device 904 to indicate the proximity of the mobile device 104. This communication may enable the associate device to perform functionality similar to the operation 1028 described with reference to FIG. 10.

Figure 13:
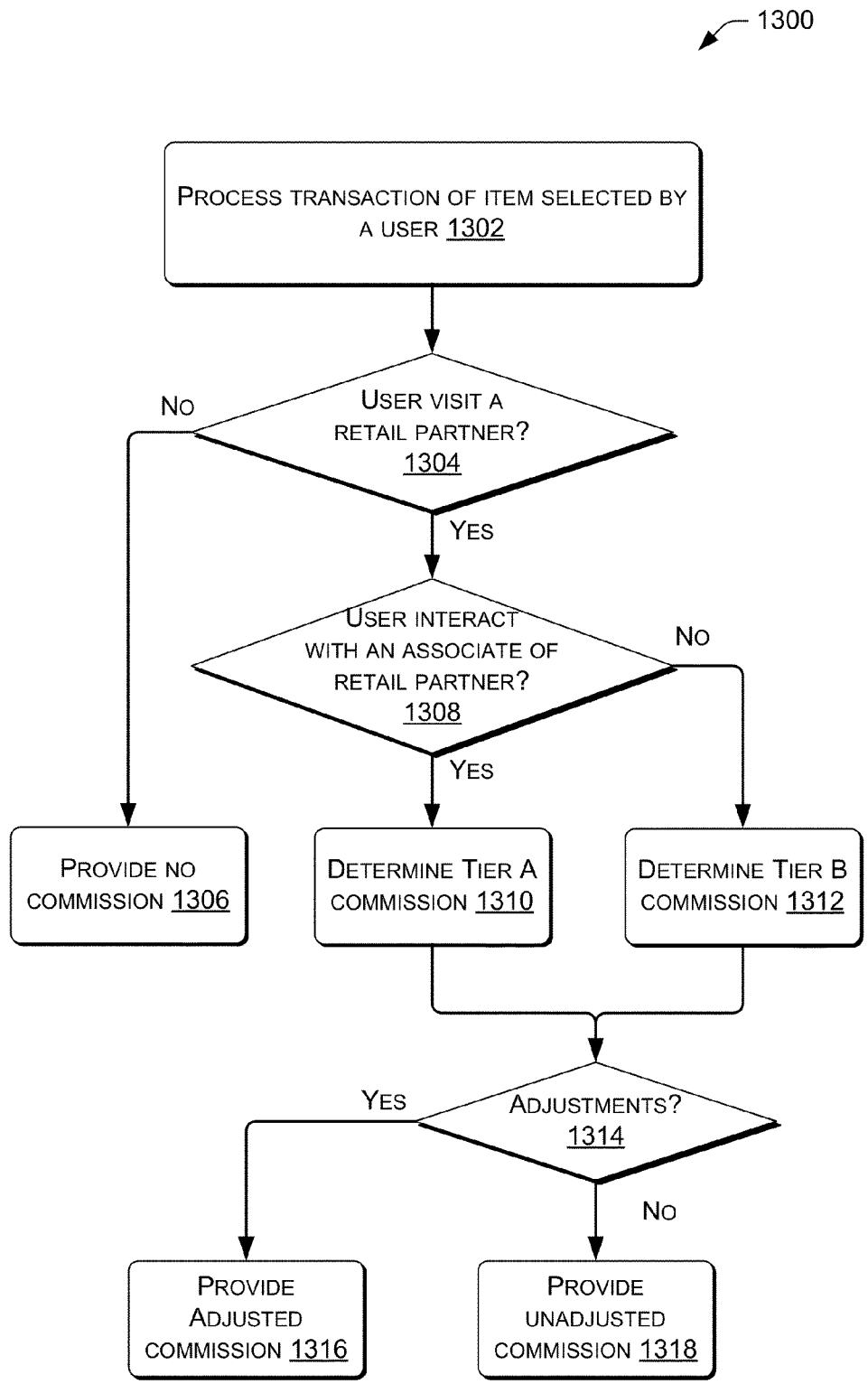
FIG. 13 is a flow diagram of an example process for determining a commission for a retail partner.

FIG. 13 is a flow diagram of an example process 1300 for determining a commission for a retail partner. The process is to be interpreted as indicated above for the other processes described herein. The process 1300 may be performed by the networked computing devices 118 or other suitable devices.

At 1302, the networked computing devices 118 may process a transaction of an item selected by the user 102. For example, the transaction may occur on an e-commerce website, application associated with an online retailer, or other communication forum that allows the user to purchase the item.

At 1304, the networked computing devices 118 may determine whether the user 102 visited the retail partner (e.g., the merchant 106). The determination may be based on any of the various techniques discussed herein, such as based on scanning of a tag associated with the merchant, via geolocation, and so forth.

When the networked computing devices 118 determine that the user did not visit the retail partner (possibly via lack of an indication, thus null data), then the networked computing devices 118 may refrain from providing commission to the retail partner at 1306 following the "no" route from the decision operation 1304.

When the networked computing devices 118 determine that the user did visit the retail partner (following the "yes" route from the decision operation 1304), then the process 1300 may continue at an operation 1308.

At 1308, the networked computing devices 118 may determine whether the user interacted with an associate of the retail partner. For example, the interaction may be concluded as occurring when the associate device 904 exchanges data with the mobile device 104 as discussed in the processes 1000 and 1100.

When the networked computing devices 118 determine that the user 102 interacted with the associate 902 of the retail partner (following the "yes" route from the decision operation 1308), then the process 1300 may continue at an operation 1310. At 1310, the networked computing devices 118 may determine a tier A commission (e.g., assistance level commission, etc.) for the retail partner.

When the networked computing devices 118 determine that the user did not interact with the associate 902 of the retail partner (following the "no" route from the decision operation 1308), then the process 1300 may continue at an operation 1312. At 1310, the networked computing devices 118 may determine a tier B commission (e.g., standard commission, etc.) for the retail partner. In some embodiments, the tier B commission may be less than or equal to the tier A commission determined at the operation 1310.

Following the operations 1310 and/or 1312, the networked computing devices 118 may determine whether the commission is to be adjusted based on any adjustment factors used to increase or reduce the commission. When the networked computing devices 118 determines to adjust the commission determined at the operation 1310 and/or 1312, then the commission may be adjusted and provided to the retail partner at the operation 1316 (following the "yes" route from the decision operation 1314). When the networked computing devices 118 determines not to adjust the commission determined at the operation 1310 and/or 1312, then the commission may be provided to the retail partner at the operation 1318 (following the "no" route from the decision operation 1314).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
under control of one or more computer systems configured with specific executable instructions,
receiving geolocation data associated with a mobile device;
determining a physical location of an associate device associated with a merchant based at least in part on geolocation data associated with the associate device;
determining, by the one or more computer systems, from the geolocation data associated with the mobile device, that a physical location of the mobile device is within a threshold distance of the physical location of the associate device during a period of time;
determining items offered for sale by the merchant;
receiving an indication that the user has purchased, from a source other than the merchant, one of the items offered by the merchant; and
calculating a commission to pay the merchant responsive to receiving the indication that the user has purchased the item from the source other than the merchant and based at least partly on the determination that the physical location of the mobile device is within the threshold distance of the associate device.

2. The method of claim 1, wherein the geolocation data is global position system (GPS) data.

3. The method of claim 1, wherein the source other than the merchant comprises an online retailer.

4. The method of claim 1, wherein the determining the items offered for sale by the merchant is determined using a lookup table that associates the items with the merchant.

5. A non-transitory computer-readable storage medium having stored therein instructions, which when executed by a processor, cause the processor to perform acts comprising:
   determining a physical location of an associate device associated with a merchant based at least in part on geolocation data associated with the associate device;
   determining, by the processor, that a physical location of a mobile device is within a threshold distance of the physical location of the associate device during a period of time;
   receiving an indication that a user associated with the mobile device has purchased, from a source other than the merchant, an item that is also offered by the merchant; and
   calculating a commission to pay the merchant responsive to the geolocation data and responsive to receiving the indication that the user has purchased the item from the source other than the merchant and based at least partly on the determination that the mobile device and the associate device are within the threshold distance.

6. The non-transitory computer-readable storage medium of claim 5, wherein the geolocation data is at least one of global position system (GPS) data or radio signal triangulation data.

7. The non-transitory computer-readable storage medium of claim 5, wherein the source other than the merchant comprises at least one of an online retailer or a catalog-order retailer.

8. The non-transitory computer-readable storage medium of claim 5, wherein the commission is based at least in part on a value of the item or a profit margin associated with the item.

9. The non-transitory computer-readable storage medium of claim 5, wherein the indication is received from a mobile device application that interacts with the source other than the merchant, the mobile device application to cause the mobile device to transmit the geolocation data and to purchase the item.

10. The non-transitory computer-readable storage medium of claim 5, wherein the acts further comprise determining that the merchant has inventory of the item.

11. The non-transitory computer-readable storage medium of claim 5, wherein the acts further comprise paying the commission to the merchant by the source other than the merchant after the user purchases the item from the source other than the merchant.

12. The non-transitory computer-readable storage medium of claim 5, wherein the acts further comprise determining that the mobile device received data from the associate device that is located at a physical location of the merchant, and wherein the commission is based at least in part on the determining that the mobile device received data from the associate device while the mobile device was at the physical location of the merchant.

13. A system comprising:
   one or more processors; and
   computer-readable media coupled to the one or more processors, the computer-readable media comprising one or more modules to:
      receive an indication from a mobile device that associates the mobile device with a brick and mortar location of a merchant;
      determine whether the mobile device is within a threshold distance from an associate device at the brick and mortar location, the associate device being associated with the merchant;
      determine that a user associated with the mobile device purchased an item from a retailer other than the merchant where the item is also offered by the merchant;
      provide assistance-level commission to the merchant in response to the determining that the user purchased the item from the retailer other than the merchant and in response to the determining that the mobile device is within the threshold distance from the associate device; and
      provide a standard commission to the merchant in response to the determining that the user purchased the item from the retailer other than the merchant and in response to the determining that the mobile device is not within the threshold distance from the associate device.

14. The system of claim 13, wherein the one or more modules receive the indication as geolocation data.

15. The system of claim 13, wherein the one or more modules communicate with a mobile device application that is executed by the mobile device.

16. The system of claim 13, wherein the one or more modules further receive a merchant identifier that is forwarded by the mobile device after being obtained from the associate device, the merchant identifier being used to provide the assistance-level commission and the standard commission.

17. The system of claim 13, wherein the one or more modules use geolocation data received from the associate device and the mobile device to determine whether the mobile device is within the threshold distance from the associate device.

18. The system of claim 13, wherein the one or more modules are further to provide a referral to purchase the item at the merchant at the brick and mortar location prior to purchase of the item.

19. The system of claim 18, wherein the referral is provided during an offer for sale of the item by the retailer other than the merchant.

20. A method comprising:
   determining, by one or more computing devices, geolocation data associated with a mobile device;
   determining, by the one or more computing devices, geolocation data associated with an associate device associated with a merchant;
   determining, by the one or more computing devices, that the mobile device is located within a threshold distance of a physical location of the associate device for a period of time based at least in part by comparing the geolocation data associated with the mobile device and the geolocation associated with the associate device;
   receiving, by the one or more computing devices, an indication that a user associated with the mobile device has purchased, from a source other than the merchant, an item that is offered for sale by the merchant; and
   calculating, by the one or more computing devices, a commission to pay the merchant in response to at least receiving the indication that the user had purchased the item from the source other than the merchant and based at least partly on the determination that the mobile device is within the threshold distance of the associate device.

21. The method of claim 20, wherein the calculating the commission to pay the merchant is based at least in part on a value of the item or a profit margin associated with the item.

22. The method of claim 20, wherein the commission is paid to the merchant by the source other than the merchant after the user purchases the item from the source other than the merchant.

23. The method of claim 20, wherein the source other than the merchant comprises at least one of an online retailer or a catalog-order retailer.

24. The method of claim 20, wherein the calculating the commission is based at least in part on advertising costs, promotional costs and display costs associated with the offering the item for sale by the merchant, and a duration of time in which the mobile device is located within the threshold distance of the associate device.

25. The method of claim 20, wherein the calculating the commission is based at least in part on a predetermined percentage of a sale price of the item at the source other than the merchant.

26. The method of claim 20, wherein the geolocation data is at least one of global position system (GPS) data or radio signal triangulation data.

* * * * *